United States Patent
Lee

(10) Patent No.: US 12,137,475 B2
(45) Date of Patent: Nov. 5, 2024

(54) METHOD AND DEVICE FOR DETERMINING SIDELINK RESOURCE IN NR V2X

(71) Applicant: LG Electronics Inc., Seoul (KR)

(72) Inventor: Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 368 days.

(21) Appl. No.: 17/771,372

(22) PCT Filed: Oct. 23, 2020

(86) PCT No.: PCT/KR2020/014582
§ 371 (c)(1),
(2) Date: Apr. 22, 2022

(87) PCT Pub. No.: WO2021/080376
PCT Pub. Date: Apr. 29, 2021

(65) Prior Publication Data
US 2022/0377749 A1   Nov. 24, 2022

(30) Foreign Application Priority Data
Oct. 23, 2019   (KR) .................. 10-2019-0132545

(51) Int. Cl.
*H04W 72/542* (2023.01)
*H04L 5/00* (2006.01)
(Continued)

(52) U.S. Cl.
CPC ......... *H04W 72/542* (2023.01); *H04L 5/0051* (2013.01); *H04W 28/26* (2013.01);
(Continued)

(58) Field of Classification Search
CPC .... H04L 5/0051; H04W 28/26; H04W 72/02; H04W 72/0446; H04W 72/20; H04W 72/56; H04W 72/542
See application file for complete search history.

(56) References Cited

U.S. PATENT DOCUMENTS

| 2020/0296731 A1* | 9/2020 | Chae ................ H04W 72/52 |
| 2021/0243749 A1* | 8/2021 | Hoang ............... H04W 72/02 |

FOREIGN PATENT DOCUMENTS

| KR | 10-2019-0050763 | 5/2019 |
| KR | 20190103321 | 9/2019 |

OTHER PUBLICATIONS

CATT, "Discussion on resource allocation mechanism for sidelink Mode 2 in NR V2X," R1-1908581, Presented at 3GPP TSG RAN WG1 Meeting #98, Prague, CZ, Aug. 26-30, 2019, 14 pages.
(Continued)

*Primary Examiner* — Brian P Cox
(74) *Attorney, Agent, or Firm* — Fish & Richardson P.C.

(57) ABSTRACT

According to one embodiment of the present disclosure, provided is a method by which a first device performs sidelink communication with a second device. The method can comprise the steps of: determining a first resource for first sidelink transmission; receiving, from the second device or a third device, on an Nth slot, SCI including information related to a second resource for second sidelink transmission; determining, on the basis of a DMRS RSRP threshold value and a DMRS RSRP measurement value of a first PSCCH related to the SCI, whether to reselect the first resource overlapping with the second resource on an N+Kth slot spaced from the Nth slot by K slot length; and transmitting, to the second device, a second PSCCH related to the first sidelink transmission or a PSSCH related to the second PSCCH, on the basis of the determination on whether to reselect.

20 Claims, 26 Drawing Sheets

(51) Int. Cl.
   *H04W 28/26*      (2009.01)
   *H04W 72/02*      (2009.01)
   *H04W 72/0446*    (2023.01)
   *H04W 72/20*      (2023.01)
   *H04W 72/56*      (2023.01)

(52) U.S. Cl.
   CPC ....... *H04W 72/02* (2013.01); *H04W 72/0446* (2013.01); *H04W 72/20* (2023.01); *H04W 72/56* (2023.01)

(56) References Cited

OTHER PUBLICATIONS

Fraunhofer HHI & Fraunhofer IIS, "Resource Allocation for Mode 2 NR V2X," R2-1910536, Presented at 3GPP TSG-RAN WG2 Meeting #107, Prague, Czech Republic, Aug. 26-30, 2019, 8 pages.

LG Electronics, "Discussion on resource allocation for Mode 2," R1-1908902, Presented at 3GPP TSG RAN WG1 #98, Prague, CZ, Aug. 26-30, 2019, 14 pages.

Vivo, "Discussion on mode 2 resource allocation mechanism," R1-1908150, Presented at 3GPP TSG RAN WG1 #98, Prague, CZ, Aug. 26-30, 2019, 17 pages.

R1-1904922, "Support of mode 2a resource allocation for NR-V2X," OPPO, 3GPP TSG-RAN WG1 Meeting #96bis, Xi'an, CN, Apr. 8-12, 2019, 8 pages.

R1-1905491, "Pre-emption in resource allocation," Ericsson, 3GPP TSG-RAN WG1 Meeting #96bis, Xi'an, CN, Apr. 8-12, 2019, 2 pages.

R1-1908276, "Resource allocation for NR sidelink Mode 1," TCL Communication, 3GPP TSG RAN WG1 Meeting #98, Prague, CZ, Aug. 26-30, 2019, 8 pages.

R1-1909186, "NR Sidelink Resource Allocation Mechanism Mode 1," NTT Docomo, Inc., 3GPP TSG RAN WG1 #98, Prague, CZ, Aug. 26-30, 7 pages.

R1-1910410, "Resource allocation for NR sidelink Mode 1," TCL Communication, 3GPP TSG RAN WG1 Meeting #98b, Chongqing, CN, 14-20 2019, 11 pages.

R2-1913825, "[Running CR] Introduction of 5G V2X with NR Sidelink," R2, 3GPP TSG-RAN WG2 Meeting #107bis, Chongqing, CN, Oct. 14-18, 32 pages.

Notice of Allowance in Korean Appn. No. 10-2022-7014855, dated Dec. 27, 2022, 2 pages (with English translation).

* cited by examiner

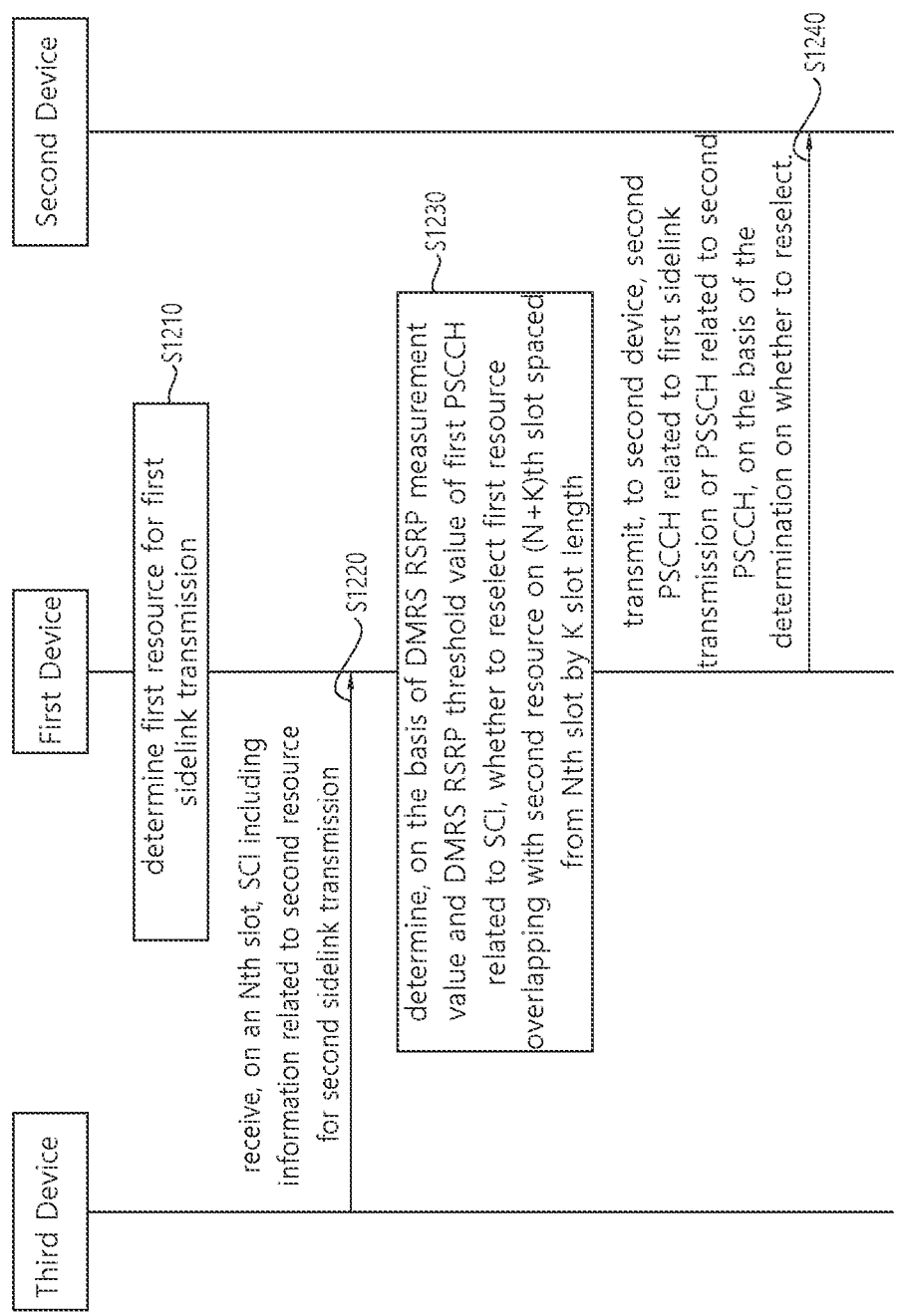

METHOD AND DEVICE FOR DETERMINING SIDELINK RESOURCE IN NR V2X

CROSS-REFERENCE TO RELATED APPLICATIONS

This application is a National Stage application under 35 U.S.C. § 371 of International Application No. PCT/KR2020/014582, filed on Oct. 23, 2020, which claims the benefit of Korean Patent Application No. 10-2019-0132545, filed on Oct. 23, 2019. The disclosures of the prior applications are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

The present disclosure provides a method for determining a sidelink resource in NR V2X and device(s) (or UE(s)) performing the method.

Technical Solutions

In an embodiment, provided is a method for performing sidelink (SL) communication with a second device by a first device. The method comprises, determining a first resource for first sidelink transmission; receiving, from the second device or a third device, on an Nth slot, Sidelink Control Information (SCI) including information related to a second resource for second sidelink transmission; determining, on the basis of a demodulation reference signal (DMRS) Reference Signal Received Power (RSRP) threshold value and a DMRS RSRP measurement value of a first physical Sidelink Control Channel (PSCCH) related to the SCI, whether to reselect the first resource overlapping with the second resource on an (N+K)th slot spaced from the Nth slot by K slot length; and transmitting, to the second device, a second PSCCH related to the first sidelink transmission or a Physical Sidelink Shared Channel (PSSCH) related to the second PSCCH, on the basis of the determination on whether to reselect, wherein at least one resource for the first sidelink transmission, including the first resource, is determined based on P slot length, which is a resource reservation period related to the first sidelink transmission, and wherein the N, the K, and the P are positive integers.

In an embodiment, provided is a first device configured to perform sidelink (SL) communication with a second device. The first device comprises, at least one memory storing instructions; at least one transceiver; and at least one processor connected to the at least one memory and the at least one transceiver, wherein the at least one processor executes the instructions to: control the at least one transceiver to receive, from the second device or a third device, on an Nth slot, SCI including information related to a second resource for second sidelink transmission, determine, on the basis of a demodulation reference signal (DMRS) Reference Signal Received Power (RSRP) threshold value and a DMRS RSRP measurement value of a first physical Sidelink Control Channel (PSCCH) related to the SCI, whether to reselect the first resource overlapping with the second resource on an (N+K)th slot spaced from the Nth slot by K slot length; and control the at least one transceiver to transmit, to the second device, a second PSCCH related to the first sidelink transmission or a PSSCH related to the second PSCCH, on the basis of the determination on whether to reselect, wherein at least one resource for the first sidelink transmission, including the first resource, is determined based on P slot length, which is a resource reservation period related to the first sidelink transmission, and wherein the N, the K, and the P are positive integers.

In an embodiment, provided is an apparatus (or a chip (set)) configured to control a first user equipment (UE) performing sidelink (SL) communication with a second UE. The apparatus comprises, at least one processor; and at least one memory connected to the at least one processor and storing instructions, wherein the at least one processor executes the instructions to: determine a first resource for first sidelink transmission, receive, from the second UE or a third UE, on an Nth slot, SCI including information related to a second resource for second sidelink transmission, determine, on the basis of a demodulation reference signal (DMRS) Reference Signal Received Power (RSRP) threshold value and a DMRS RSRP measurement value of a first physical Sidelink Control Channel (PSCCH) related to the SCI, whether to reselect the first resource overlapping with the second resource on an (N+K)th slot spaced from the Nth slot by K slot length; and transmit, to the second UE, a second PSCCH related to the first sidelink transmission or a PSSCH related to the second PSCCH, on the basis of the determination on whether to reselect, wherein at least one resource for the first sidelink transmission, including the first resource, is determined based on P slot length, which is a resource reservation period related to the first sidelink transmission, and wherein the N, the K, and the P are positive integers.

In an embodiment, provided is a non-transitory computer-readable storage medium storing instructions (or commands). The non-transitory computer-readable storage medium, when the instructions are executed, causes a first device to: determine a first resource for first sidelink transmission, receive, from the second UE or a third UE, on an Nth slot, SCI including information related to a second resource for second sidelink transmission, determine, on the basis of a DMRS RSRP threshold value and a DMRS RSRP measurement value of a first PSCCH related to the SCI, whether to reselect the first resource overlapping with the second resource on an (N+K)th slot spaced from the Nth slot by K slot length; and transmit, to the second UE, a second PSCCH related to the first sidelink transmission or a PSSCH related to the second PSCCH, on the basis of the determination on whether to reselect, wherein at least one resource for the first sidelink transmission, including the first resource, is determined based on P slot length, which is a resource reservation period related to the first sidelink transmission, and wherein the N, the K, and the P are positive integers.

In an embodiment, provided is a method for performing sidelink (SL) communication with a first device by a second device. The method comprises: receiving, from the first device, on the basis of a second resource determined by reselecting a first resource for a first sidelink transmission by the first device, a first PSCCH associated with the first sidelink transmission or a first PSSCH associated with the first PSCCH, wherein SCI including information related to a third resource for second sidelink transmission is received by the first device from the second device or a third device, on an Nth slot, wherein, on the basis of a DMRS RSRP threshold value and a DMRS RSRP measurement value of a second PSCCH related to the SCI, it is determined, by the first device, to reselect the first resource overlapping with the third resource on an (N+K)th slot spaced from the Nth slot by K slot length, wherein at least one resource for the first sidelink transmission, including the first resource, is determined based on P slot length, which is a resource reservation period related to the first sidelink transmission, and wherein the N, the K, and the P are positive integers.

In an embodiment, provided is a second device configured to perform sidelink (SL) communication with a first device. The first device comprises at least one memory storing instructions; at least one transceiver; and at least one processor connected to the at least one memory and the at least one transceiver, wherein the at least one processor executes the instructions to: control the at least one transceiver to receive, from the first device, on the basis of a second resource determined by reselecting a first resource for a first sidelink transmission by the first device, a first PSCCH associated with the first sidelink transmission or a first PSSCH associated with the first PSCCH, wherein SCI including information related to a third resource for second sidelink transmission is received by the first device from the second device or a third device, on an Nth slot, wherein, on the basis of a DMRS RSRP threshold value and a DMRS RSRP measurement value of a second PSCCH related to the SCI, it is determined, by the first device, to reselect the first resource overlapping with the third resource on an (N+K)th slot spaced from the Nth slot by K slot length, wherein at least one resource for the first sidelink transmission, including the first resource, is determined based on P slot length, which is a resource reservation period related to the first sidelink transmission, and wherein the N, the K, and the P are positive integers.

Effects of the Disclosure

Based on the present disclosure, V2X communication between devices (or UEs) can be efficiently performed.

Based on the present disclosure, by preventing or reducing unnecessary reselection due to a preemption check operation performed in advance for a reserved resource based on a subsequent resource reservation period, it is possible to reduce the probability of transmission resource collision between different UEs.

BRIEF DESCRIPTION OF THE DRAWINGS

FIG. 12 is a flowchart illustrating a method for reselecting a sidelink resource by a first device and a second device according to an embodiment.

DESCRIPTION OF EXEMPLARY EMBODIMENTS

Figure 1:
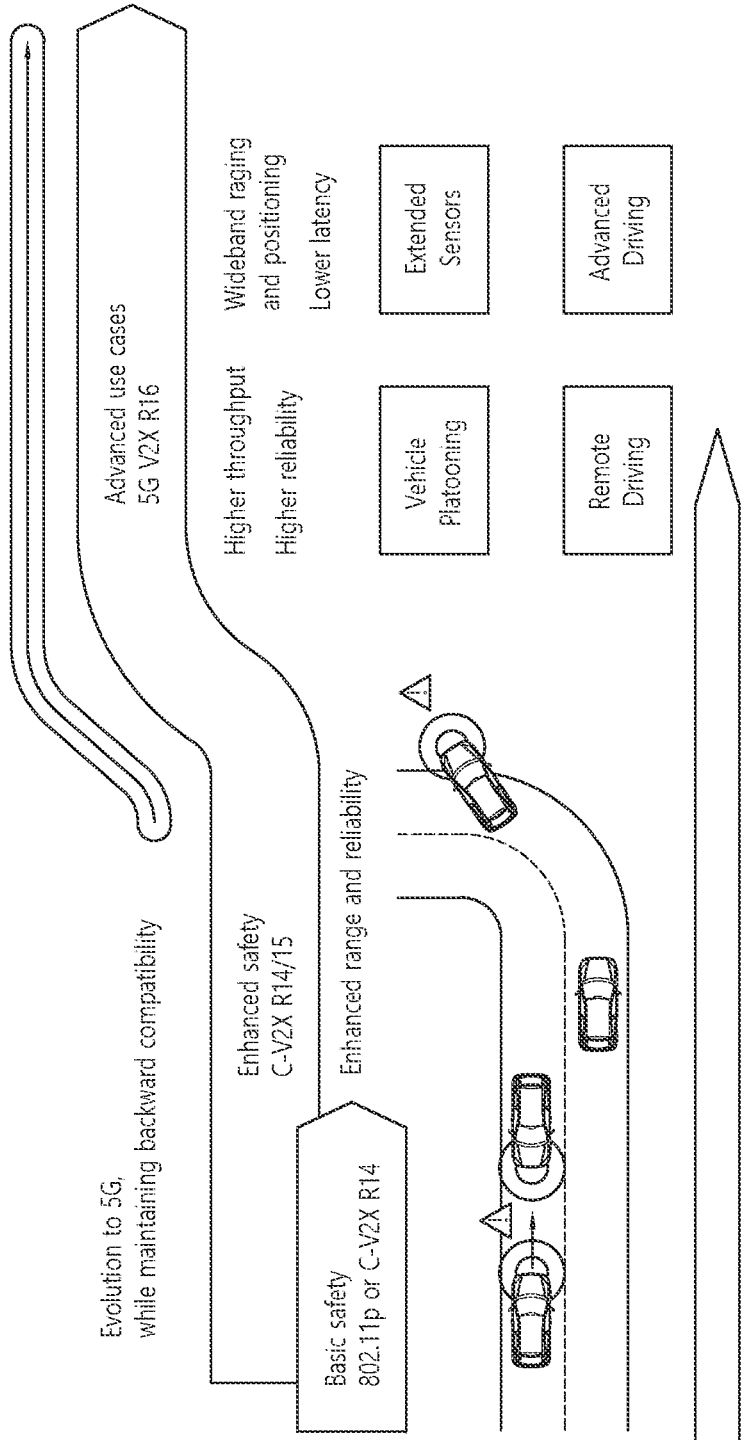
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
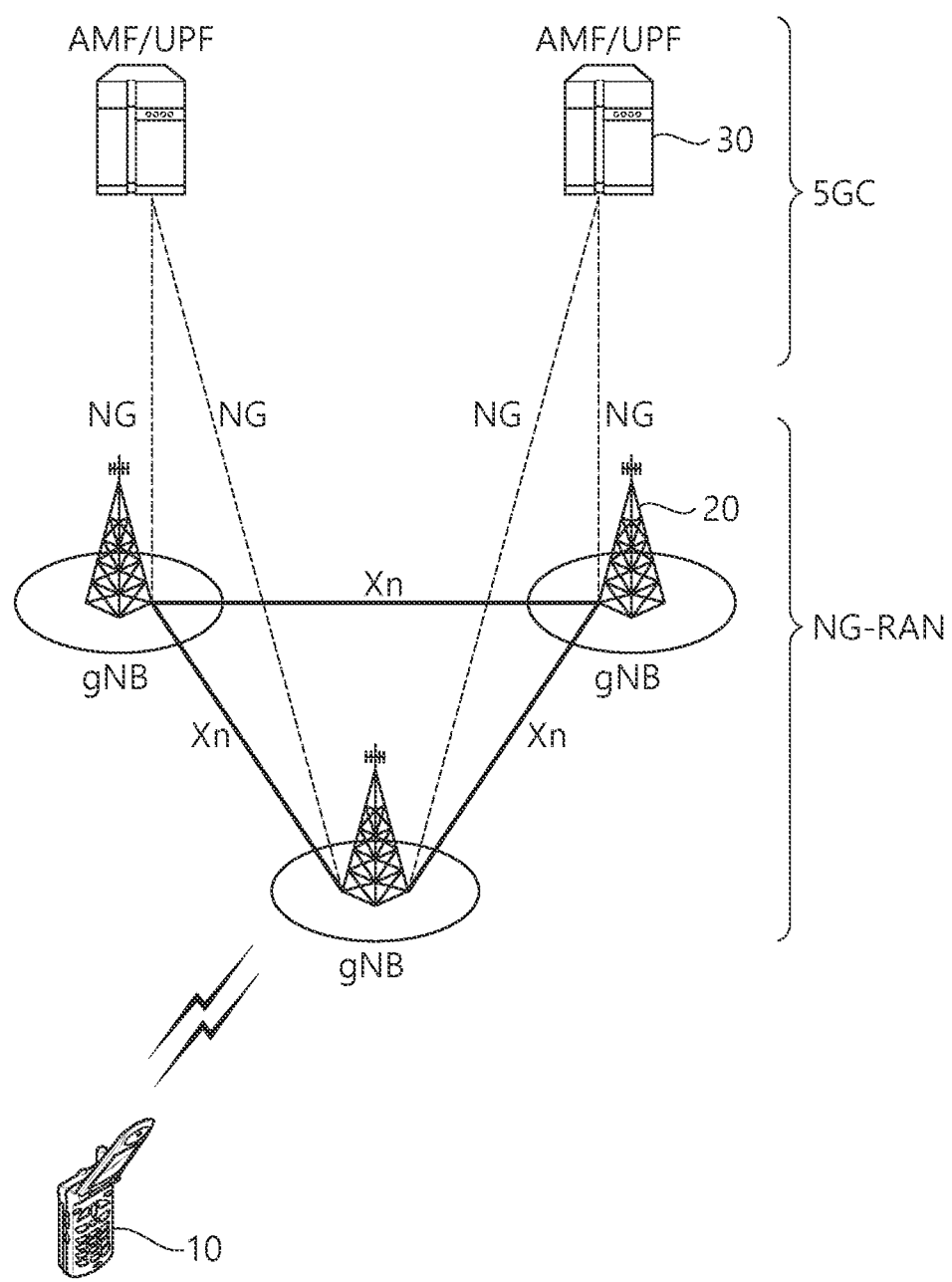
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
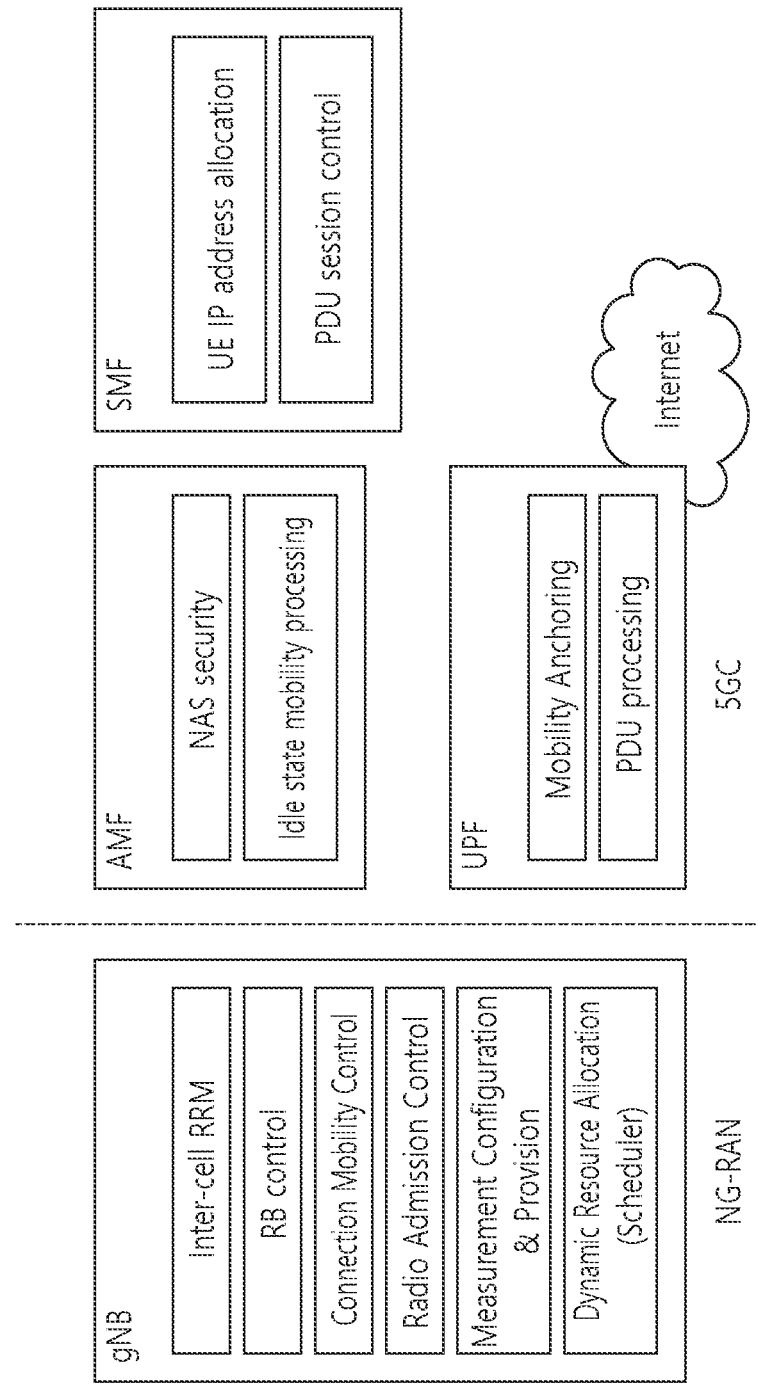
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
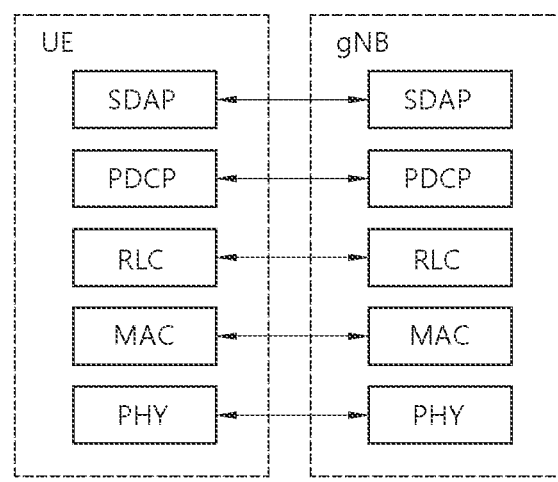
FIGS. 4A and 4B show a radio protocol architecture, based on an embodiment of the present disclosure.
Figure 4B:
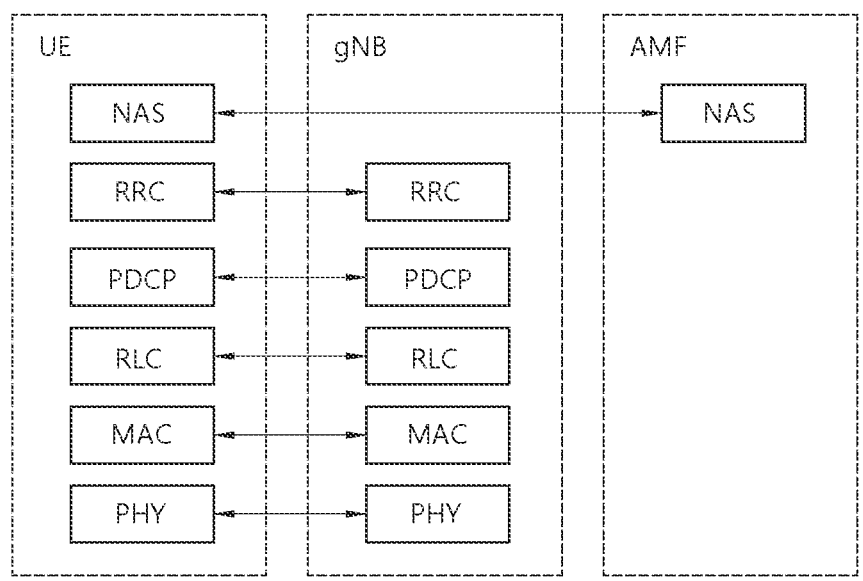

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
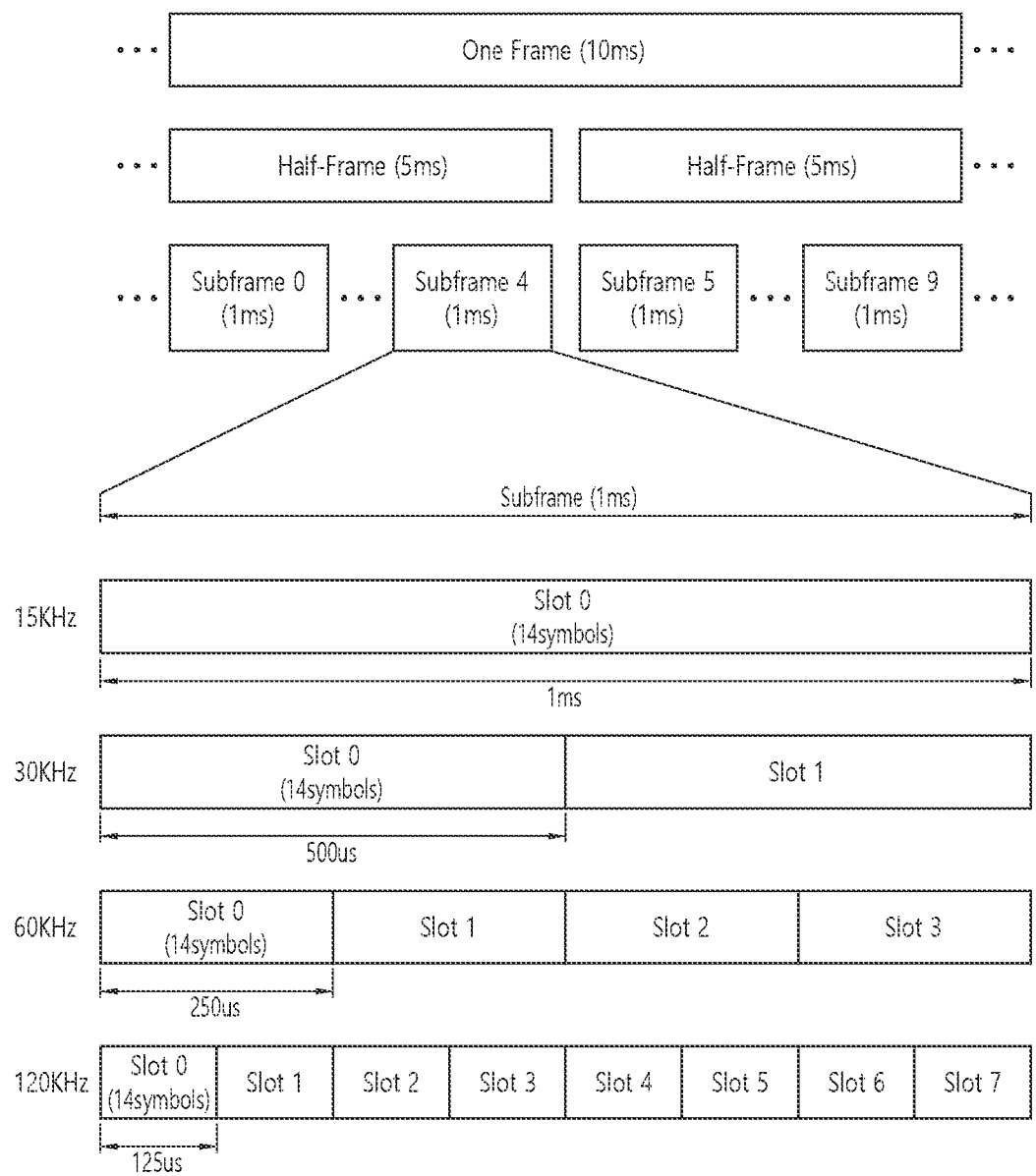
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
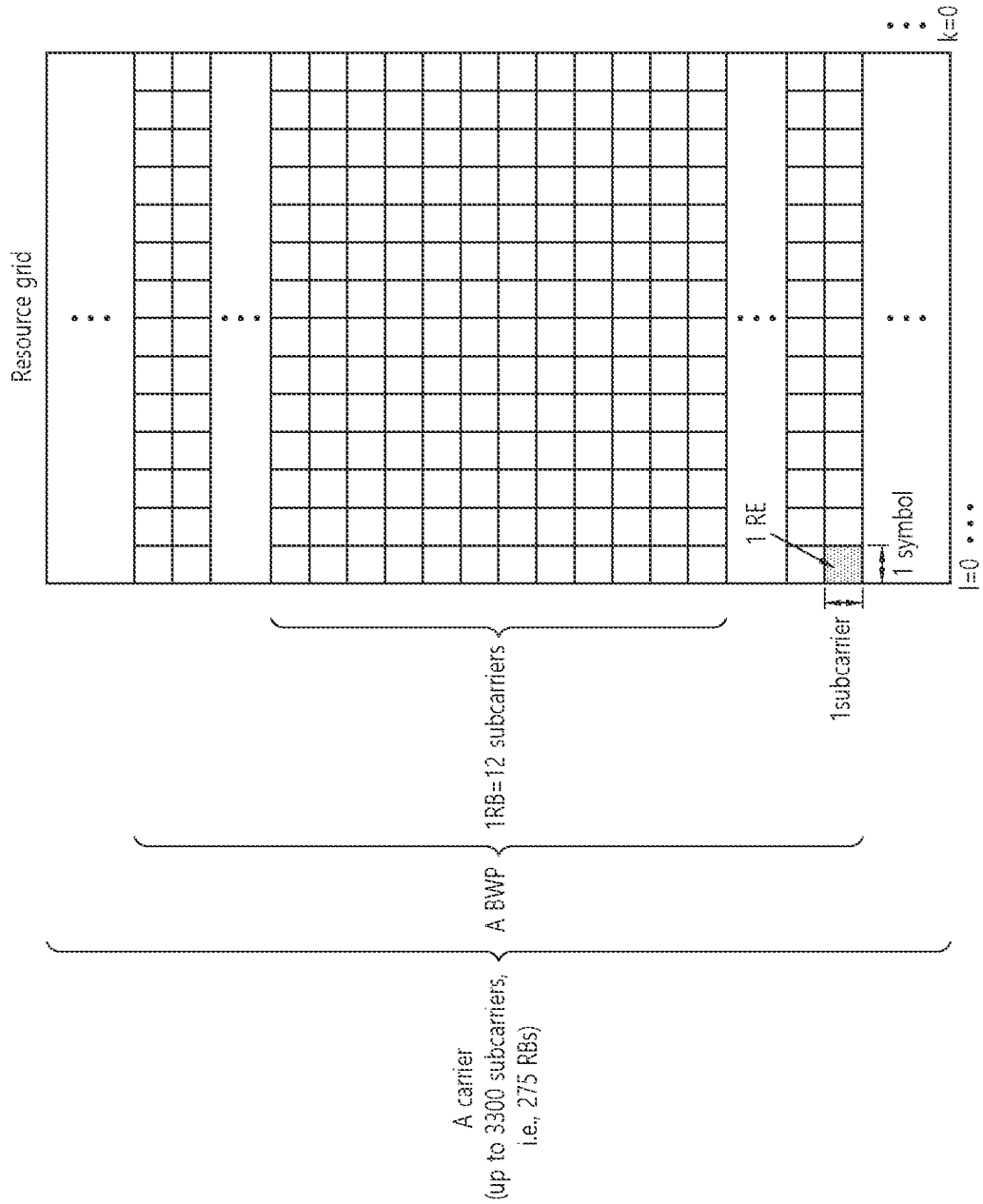
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
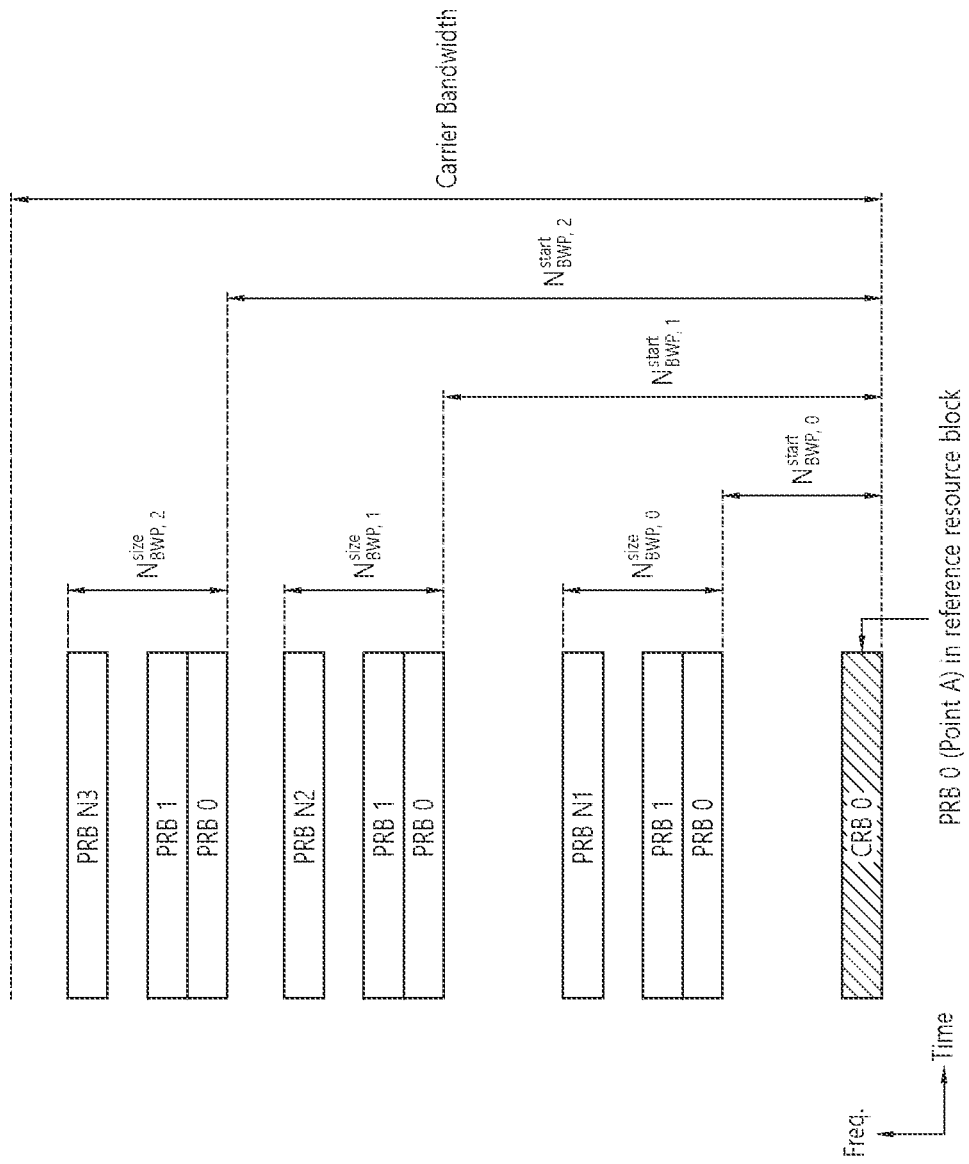
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
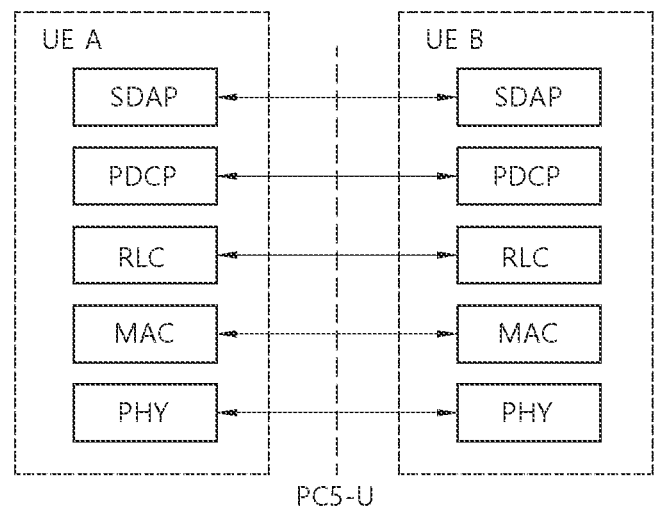
FIGS. 8A and 8B show a radio protocol architecture for a SL communication, based on an embodiment of the present disclosure.
Figure 8B:
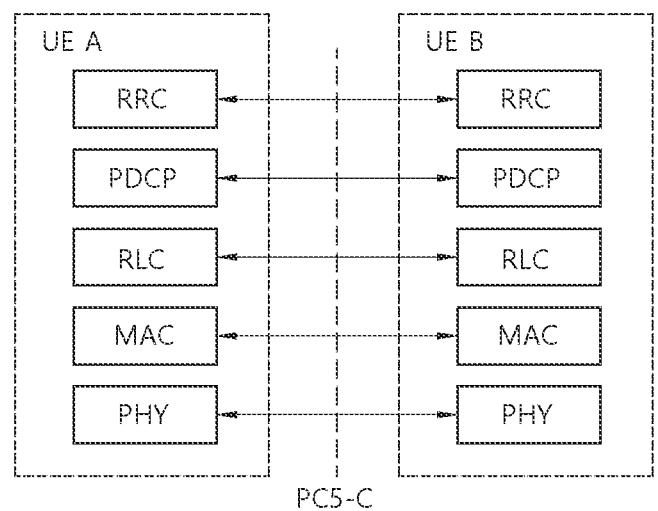

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
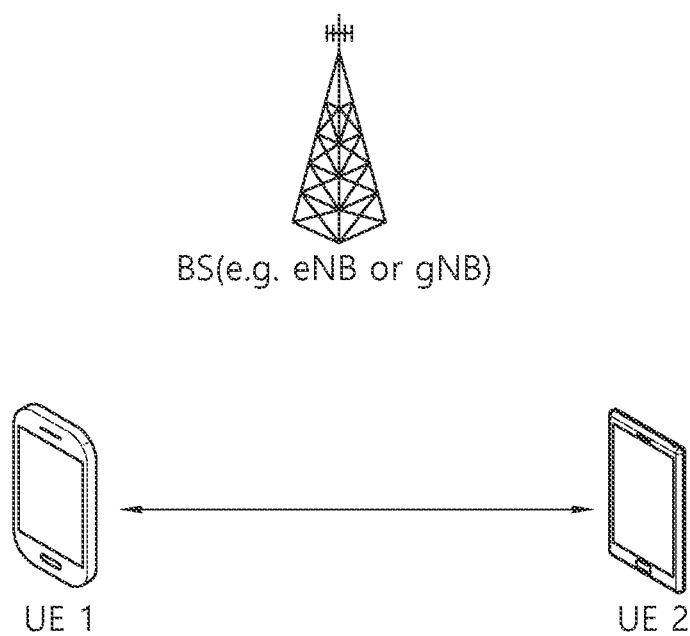
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
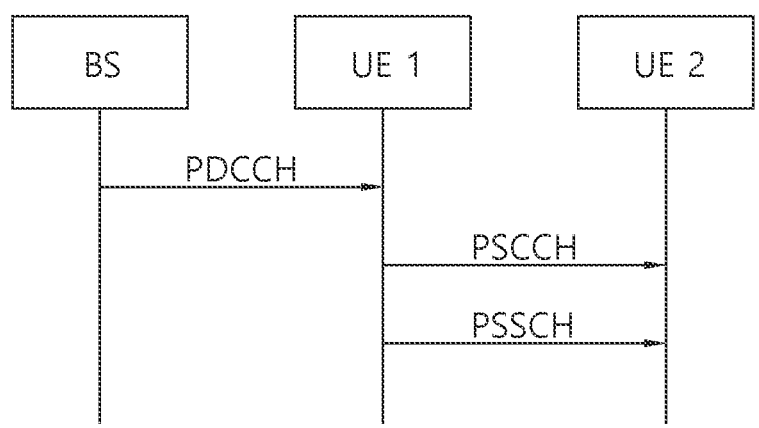
FIGS. 10A and 10B show a procedure of performing V2X or SL communication by a UE based on a transmission mode, based on an embodiment of the present disclosure.
Figure 10B:
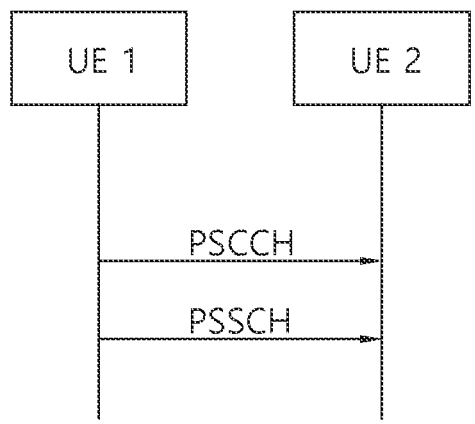

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
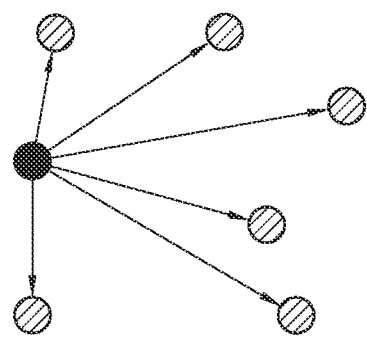
FIGS. 11A to 11C show three cast types, based on an embodiment of the present disclosure.
Figure 11B:
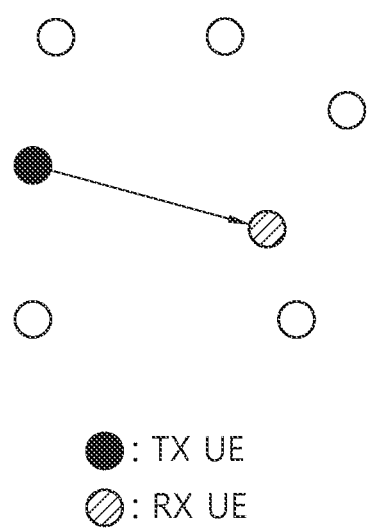
Figure 11C:
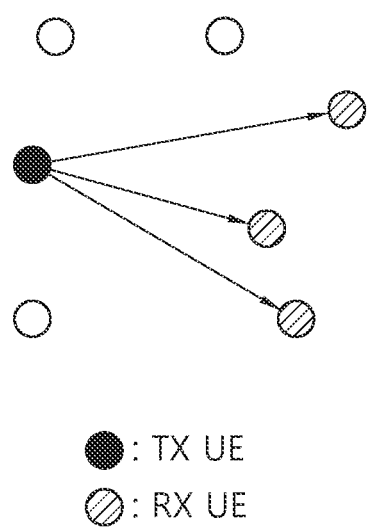

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) of the UE may include decoding operation(s) and/or receiving operation(s) of SL channel(s) and/or SL signal(s) (e.g., PSCCH, PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

Meanwhile, in the present disclosure, a high priority may mean a small priority value, and a low priority may mean a large priority value. For example, Table 5 shows an example of priorities.

TABLE 5

| service or logical channel | priority value |
|---|---|
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast HARQ feedback option 1: NACK information may be transmitted to the TX UE only if the RX UE fails to decode/receive the PSSCH received from the TX UE.

(2) groupcast HARQ feedback option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) reference signal received power (RSRP) (and/or SL (L1) reference signal received quality (RSRQ) and/or SL (L1) reference signal strength indicator (RSSI)) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information
- Redundancy Version (RV) information
- (Transmission traffic/packet related) QoS information (e.g., priority information)
- SL CSI-RS transmission indicator or information on the number of antenna ports for (transmitting) SL CSI-RS
- TX UE location information or location (or distance range) information of the target RX UE (for which SL HARQ feedback is requested)
- Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel.

Meanwhile, in the present disclosure, cast may be replaced/substituted with at least one of unicast, groupcast, and/or broadcast, or vice versa. For example, a cast type may be replaced/substituted with at least one of unicast, groupcast, and/or broadcast, or vice versa. For example, the cast or the cast type may include unicast, groupcast and/or broadcast.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a Uu channel may include a UL channel and/or a DL channel. For example, the UL channel may include a PUSCH, a PUCCH, etc. For example, the DL channel may include a PDCCH, a PDSCH, etc. For example, a SL channel may include a PSCCH, a PSSCH, a PSFCH, a PSBCH, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

FIG. 12 is a flowchart illustrating a method for reselecting a sidelink resource by a first device and a second device according to an embodiment.

In an embodiment, the first device shown in the flowchart of FIG. 12 may correspond to the first device of FIGS. 14 and 15 to be described later, and the second device shown in the flowchart of FIG. 12 may correspond to the second device shown in FIGS. 14 and 15 to be described later.

In step S1210, the first device according to an embodiment may determine a first resource for first sidelink transmission. In step S1220, the first device according to an embodiment may receive, from a third device (or the second device), on an Nth slot, SCI including information related to a second resource for second sidelink transmission. Although FIG. 12 shows that the SCI is received from the third device, those skilled in the art will easily understand that the third device may be the same device, rather than a separate device from the second device. In step S1230, the first device according to an embodiment may determine, on the basis of a DMRS RSRP measurement value and a DMRS RSRP threshold value of a first PSCCH related to the SCI, whether to reselect the first resource overlapping with the second resource on the (N+K)th slot spaced from the Nth slot by K slot length. In step S1240, the first device according to an embodiment may transmit, to the second device, a second PSCCH related to the first sidelink transmission or a PSSCH related to the second PSCCH, on the basis of the determination on whether to reselect.

Hereinafter, various embodiments and examples directly or indirectly related to at least one of steps S1210 to S1240 will be reviewed.

Meanwhile, according to an embodiment of the present disclosure, under a sidelink (SL) communication environment, in order to protect relatively high priority SL information transmitted and/or received by a UE, the UE may perform the following operations.

For example, the TX UE may signal or transmit information on the resource reserved/selected by the TX UE through the PSCCH (for example, SCI). For example, the TX UE may signal or transmit information on the resource reserved/selected by the TX UE to other nearby UEs through the PSCCH (for example, SCI). For example, the TX UE may decode a PSCCH transmitted from another UE. For example, the TX UE may know the priority of a resource reserved/selected by the other UE and/or the SL information transmitted on the reserved/selected resource, by decoding the PSCCH transmitted by the other UE, In this case, based on the PSCCH decoding of the TX UE, the TX UE may determine that the resource, which is reserved/selected by another UE for transmitting (relatively) high-priority SL information, is overlapped with part or all of the resource reserved/selected by the TX UE, and when the RSRP value, which is measured by the TX UE based on the DMRS on the PSSCH (hereinafter, referred to as the PSSCH DMRS RSRP measurement value), is higher than a pre-configured threshold value, the TX UE may perform the first operation. And/or, for example, based on the PSCCH decoding of the TX UE, the TX UE may determine that the resource, which is reserved/selected by another UE for transmitting (relatively) high-priority SL information, is overlapped with part or all of the resource reserved/selected by the TX UE, and when the RSRP value, which is measured by the TX UE based on the DMRS on the PSCCH (hereinafter, referred to as the PSCCH DMRS RSRP measurement value), is higher than a pre-configured threshold value, the TX UE may perform the first operation. Here, for example, a resource reserved/selected by another UE for transmitting H_MSG may be partially or entirely overlapped with a resource reserved/selected by the TX UE on a frequency resource domain and/or a time resource domain. For example, the PSSCH may be scheduled by the PSCCH. For example, the PSSCH may be interlocked with the PSCCH. For the convenience of description, (relatively) high priority SL information may be referred to as H_MSG.

For example, according to the first operation of the TX UE, among the resources reserved/selected by the TX UE, the TX UE may reselect only resources that partially or entirely overlapped with resources reserved/selected by other UEs for transmission of H_MSG. And/or, for example, among the resources reserved/selected by the TX UE, the TX UE may reselect resources that partially or completely overlapped with resources reserved/selected by other UEs and reserved/selected resources after the overlapped resources for transmission of H_MSG. And/or, for example, the TX UE may reselect all the resources reserved/selected by the TX UE.

And/or, for example, according to the first operation of the TX UE, the TX UE may reselect the entire reserved/selected resource scheduled by the PSCCH (for example, SCI) which signals information on resources reserved/selected by other UEs overlapping with all or part of the resources reserved/selected by the TX UE. And/or, for example, among all reserved/selected resources, the TX UE may reselect the reserved/selected resource after the time and during the time when the resource overlap occurs.

For example, the overlapping resource may be a resource in which a part or all of the overlapping resource actually overlaps in the physical resource domain. For example, the physical resource domain may include a physical time domain resource and/or a physical frequency domain resource.

And/or, for example, resources for transmission and reception of SL information of different priorities are reserved/selected in the form of FDM with each other, in order for the UE to receive (relatively) high priority SL information, when the (relatively) low-priority SL information cannot be transmitted (on previously reserved/selected resources), the resource reserved/selected in the form of FDM may be an overlapping resource. For example, when resources reserved/selected for SL transmission of different priorities are overlapped in the time domain, the reserved/selected resource may be an overlapping resource. In this case, for example, in order for the UE to receive (relatively) high priority SL information, the UE may reselect the reserved/selected resources for transmission of (relatively) low-priority SL information which are partially or entirely overlapped, on a time resource domain, with resources reserved/selected for reception of (relatively) high-priority SL information.

According to various embodiments of the present disclosure, The TX UE—that has signaled or transmitted information resources reserved/selected for transmission of (relatively) low-priority SL information (to a neighboring UE through PSCCH)—may measure PSSCH DMRS RSRP and/or PSCCH DMRS RSRP for resources reserved/selected for transmission of H_MSG (by other UEs) according to the following (some) rules. For the convenience of description, (relatively) low priority SL information may be referred to as L_MSG. For example, in a situation where the operation according to the above-described embodiment is configured/applied, the TX UE may measure PSSCH DMRS RSRP and/or PSCCH DMRS RSRP for resources reserved/selected by another UE, in order to transmit H_MSG.

For example, whether all or part of the various embodiments of the present disclosure are applied may be configured differently or independently according to at least one of a resource pool, a service type, a service priority, a cast type, a destination UE, a (L1 or L2) destination ID, a (L1 or L2) source ID, a (groupcast) SL HARQ feedback type, a QoS parameter, a (resource pool) congestion level, a mode type, whether an SL_CSI ONLY is transmitted, a numerology (for example, subcarrier spacing, CP length) type, whether it is retransmission, and/or whether it is initial transmission. And/or, for example, whether various embodiments of the present disclosure are enabling or disabling may be configured differently or independently according to at least one of a resource pool, a service type, a service priority, a cast type, a destination UE, a (L1 or L2) destination ID, a (L1 or L2) source ID, a (groupcast) SL HARQ feedback type, a QoS parameter, a (resource pool) congestion level, a mode type, whether an SL_CSI ONLY is transmitted, a numerology (for example, subcarrier spacing, CP length) type, whether it is retransmission, and/or whether it is initial transmission. And/or, for example, related parameters (for example, a threshold value, a PSSCH DMRS RSRP threshold value, a PSCCH DMRS RSRP threshold value) may be configured differently or independently according to at least one of a resource pool, a service type, a service priority, a cast type, a destination UE, a (L1 or L2) destination ID, a (L1 or L2) source ID, a (groupcast) SL HARQ feedback type, a QoS parameter, a (resource pool) congestion level, a mode type, whether an SL_CSI ONLY is transmitted, a numerology (for example, subcarrier spacing, CP length) type, whether it is retransmission, and/or whether it is initial transmission. Here, for example, the mode type may include resource allocation mode 1 and/or resource allocation mode 2. For example, the (groupcast) SL HARQ feedback type may include a method for transmitting NACK information only when the UE fails to decode/receive PSSCH, and/or a method for transmitting ACK information when the UE succeeds in decoding/receiving PSSCH, and transmitting NACK information when it fails.

In addition, for example, as described above, the TX UE transmitting L_MSG, may consider the resources reserved/selected for the H_MSG partially or completely overlapped with the resources reserved/selected for the L_MSG, so that the TX UE may decide/determine whether to reselect the reserved/selected resource (for L_MSG transmission) of the TX UE. In this case, by using a PSSCH DMRS RSRP threshold value and/or a PSCCH DMRS RSRP threshold related to (pre-configured) H_MSG, the TX UE may decide/determine whether to reselect the reserved/selected resources (for L_MSG transmission). Here, for example, the PSSCH DMRS RSRP threshold value and/or the PSCCH DMRS RSRP threshold value may be configured differently depending on whether the H_MSG is to be initially transmitted or retransmitted. And/or, for example, the PSSCH DMRS RSRP threshold value and/or the PSCCH DMRS RSRP threshold value may be configured differently depending on whether the L_MSG is to be initially transmitted or retransmitted.

For example, for the convenience of explanation, it is assumed that the time at which the TX UE decodes/receives the PSCCH and/or the PSSCH is slot #N. Here, for example, another UE may signal or transmit information on a resource reserved/selected for H_MSG transmission to the TX UE through PSCCH and/or PSSCH. And, for example, it is assumed that the transmission time of the PSSCH and/or the PSCCH scheduled by the (corresponding) PSCCH (for example, the PSCCH received on the slot #N) is the slot #(N+K). Here, for example, the K value may be zero or a positive integer. For example, K may be a positive integer.

For example, when performing periodic resource reservation, if the pre-emption check and the reselection operation for the pre-empted resource are performed in advance even for the reserved resource of the excessively distant future period (FR_PRD), at the time of actual FR_PRD, although the fact that the related resource may not become a pre-empted resource, a problem may occur in which resource reselection is triggered (that is, the probability of transmission resource collision between different UEs may be increased). With respect to this example, in an embodiment, when performing periodic resource reservation, pre-emption check and reselection operation for pre-empted resources may be limited to reserved resources within one period, in which the reservation resource that appears the earliest at or after the current time is included.

According to an embodiment of the present disclosure, if resources reserved/selected by the TX UE for transmission of L_MSG and resources reserved/selected by another UE for transmission of H_MSG are partially or entirely overlapped in slot #(N+K), and if the PSCCH DMRS RSRP measurement value, related to H_MSG, measured by the TX UE on slot #N is greater than a pre-configured threshold value, the TX UE may reselect a resource reserved/selected for transmission of L_MSG on slot #(N+K). And/or, for example, if resources reserved/selected by the TX UE for transmission of L_MSG and resources reserved/selected by another UE for transmission of H_MSG are partially or entirely overlapped in slot #(N+K), and if the PSCCH DMRS RSRP measurement value, related to H_MSG, measured by the TX UE on slot #N is greater than a pre-configured threshold value, the TX UE may reselect a resource reserved/selected for transmission of L_MSG on slot #(N+K) and a resource reserved/selected for transmission of L_MSG after slot #(N+K). And/or, for example, if resources reserved/selected by the TX UE for transmission of L_MSG and resources reserved/selected by another UE for transmission of H_MSG are partially or entirely overlapped in slot #(N+K), and if the PSCCH DMRS RSRP measurement value, related to H_MSG, measured by the TX UE on slot #N is greater than a pre-configured threshold value, the TX UE may reselect all resources reserved/selected for transmission of L_MSG. For the convenience of description, the case where the PSCCH DMRS RSRP measurement value, related to H_MSG, measured by the TX UE on slot #N is greater than a pre-configured threshold may be referred to as CASE A.

According to an embodiment of the present disclosure, if resources reserved/selected by the TX UE for transmission of L_MSG and resources reserved/selected by another UE for transmission of H_MSG are partially or entirely overlapped in slot #(N+K), and if the PSSCH DMRS RSRP measurement value measured by the TX UE on slot #N is greater than the pre-configured threshold, the TX UE may reselect the resource reserved/selected for transmission of L_MSG on slot #(N+K). And/or, for example, if resources reserved/selected by the TX UE for transmission of L_MSG and resources reserved/selected by another UE for transmission of H_MSG are partially or entirely overlapped in slot #(N+K), and if the PSSCH DMRS RSRP measurement value measured by the TX UE on slot #N is greater than the pre-configured threshold, the TX UE may reselect the resource reserved/selected for transmission of L_MSG on slot #(N+K) and the resource reserved/selected for transmission of L_MSG after slot #(N+K). And/or, for example, if resources reserved/selected by the TX UE for transmission of L_MSG and resources reserved/selected by another UE for transmission of H_MSG are partially or entirely overlapped in slot #(N+K), and if the PSSCH DMRS RSRP measurement value measured by the TX UE on slot #N is greater than the pre-configured threshold, the TX UE may reselect all resources reserved/selected for transmission of L_MSG. For the convenience of explanation, the case where the PSSCH DMRS RSRP measurement value measured by the TX UE on slot #N is greater than a pre-configured threshold value may be referred to as CASE B.

According to an embodiment of the present disclosure, if a resource reserved/selected by the TX UE for transmission of L_MSG and a resource reserved/selected by another UE for transmission of H_MSG are partially or entirely overlapped in slot #(N+K), and if the average value or the maximum value or the minimum value of the PSCCH DMRS RSRP measurement value and the PSSCH DMRS RSRP measurement value, related to H_MSG, measured on the slot #N by the TX UE is greater than a pre-configured threshold value, the TX UE may reselect the resource reserved/selected for transmission of L_MSG on slot #(N+K). And/or, for example, if a resource reserved/selected by the TX UE for transmission of L_MSG and a resource reserved/selected by another UE for transmission of H_MSG are partially or entirely overlapped in slot #(N+K), and if the average value or the maximum value or the minimum value of the PSCCH DMRS RSRP measurement value and the PSSCH DMRS RSRP measurement value, related to H_MSG, measured on the slot #N by the TX UE is greater than a pre-configured threshold value, the TX UE may reselect the resource reserved/selected for transmission of L_MSG on slot #(N+K) and the resource reserved/selected for transmission of L_MSG after slot #(N+K). And/or, for example, if a resource reserved/selected by the TX UE for transmission of L_MSG and a resource reserved/selected by another UE for transmission of H_MSG are partially or entirely overlapped in slot #(N+K), and if the average value or the maximum value or the minimum value of the PSCCH DMRS RSRP measurement value and the PSSCH DMRS RSRP measurement value, related to H_MSG, measured on the slot #N by the TX UE is greater than a pre-configured threshold value, the TX UE may reselect all resources reserved/selected for transmission of L_MSG. For the convenience of explanation, the case where the average value or the maximum value or the minimum value of the PSCCH DMRS RSRP measurement value and the PSSCH DMRS RSRP measurement value, related to H_MSG, measured on the slot #N by the TX UE is greater than a pre-configured threshold value may be referred to as CASE C.

Here, for example, in case of CASE B, not depending on the PSSCH DMRS RSRP measurement value, related to H_MSG, on the slot #(N+K) that is actually overlapped (with the resource reserved/selected by the TX UE for the transmission of L_MSG), depending on the PSSCH DMRS RSRP measurement value, related to H_MSG, at the time point of the PSCCH transmission in which the scheduling information related to H_MSG is signaled, the TX UE may determine whether to reselect the resource reserved/selected for transmission of L_MSG on slot #(N+K). And/or, for example, for CASE B, not depending on the PSSCH DMRS RSRP measurement value—which is related to H_MSG—on the slot #(N+K) that is actually overlapped (with the resource reserved/selected by the TX UE for the transmission of L_MSG), depending on the (previous) PSSCH DMRS RSRP measurement value (related to H_MSG) at another time point, the TX UE may determine whether to reselect the resource reserved/selected for transmission of L_MSG on slot #(N+K).

Here, for example, CASE A may be limitedly applied only when the H_MSG-related PSCCH and the H_MSG-related PSSCH are transmitted on different slots. For example, CASE A may be limitedly applied only when the H_MSG-related PSCCH and the H_MSG-related PSSCH are transmitted in TDM format. For example, CASE A may be limitedly applied only when the H_MSG-related PSCCH and the H_MSG-related PSSCH/PSCCH are transmitted on different slots.

According to an embodiment of the present disclosure, if resources reserved/selected by the TX UE for transmission of L_MSG and resources reserved/selected by another UE for transmission of H_MSG are partially or entirely overlapped in slot #(N+K), and if the TX UE decodes/receives the H_MSG related PSCCH on slot #N, the TX UE may reselect the resource reserved/selected for transmission of L_MSG on slot #(N+K). And/or, for example, if resources reserved/selected by the TX UE for transmission of L_MSG and resources reserved/selected by another UE for transmission of H_MSG are partially or entirely overlapped in slot #(N+K), and if the TX UE decodes/receives the H_MSG related PSCCH on slot #N, the TX UE may reselect a resource reserved/selected for transmission of L_MSG on slot #(N+K) and a resource reserved/selected for transmission of L_MSG after slot #(N+K). And/or, for example, if resources reserved/selected by the TX UE for transmission of L_MSG and resources reserved/selected by another UE for transmission of H_MSG are partially or entirely overlapped in slot #(N+K), and if the TX UE decodes/receives the H_MSG related PSCCH on slot #N, the TX UE may reselect all resources reserved/selected for transmission of L_MSG.

And/or, for example, if resources reserved/selected by the TX UE for transmission of L_MSG and resources reserved/selected by another UE for transmission of H_MSG are partially or entirely overlapped in slot #(N+K), and if the TX UE decodes/receives the H_MSG related PSCCH on slot #N, the TX UE may measure the PSSCH DMRS RSRP and/or the PSCCH DMRS RSRP, related to H_MSG, on slot #(N+K). For example, in this case, the TX UE may not perform transmission of L_MSG on slot #(N+K). In this case, if the PSSCH DMRS RSRP measurement value and/or the PSCCH DMRS RSRP measurement value, related to H_MSG, on the slot # (N+K) is greater than the pre-configured threshold, the TX UE may reselect the resource reserved/selected for transmission of L_MSG on slot #(N+K) or slot #(N+K+P). And/or, for example, the TX UE may reselect the resource reserved/selected for transmission of L_MSG on slot #(N+K) or slot #(N+K+P) and the resource reserved/selected for transmission of L_MSG after slot #(N+K) or slot #(N+K+P). And/or, for example, the TX UE may reselect the entire resource reserved/selected for transmission of L_MSG. Here, for example, P may be a resource reservation period value. For the convenience of description, the PSSCH DMRS RSRP measurement value and/or PSCCH DMRS RSRP measurement value, related to H_MSG, on slot #(N+K) may be referred to as ACT_RSRP.

And/or, for example, if resources reserved/selected by the TX UE for transmission of L_MSG and resources reserved/selected by another UE for transmission of H_MSG are partially or entirely overlapped in slot #(N+K), and if the TX UE decodes/receives the H_MSG related PSCCH on slot #N, the TX UE may measure the PSCCH DMRS RSRP and/or PSSCH DMRS RSRP related to H_MSG on slot #N. In this case, if the PSCCH DMRS RSRP measurement value and/or the PSSCH DMRS RSRP measurement value related to H_MSG on slot #N is greater than a pre-configured threshold, the TX UE may reselect the resource reserved/selected for transmission of L_MSG on slot #(N+K) or slot #(N+K+P). And/or, for example, the TX UE may reselect the resource reserved/selected for transmission of L_MSG on slot #(N+K) or slot #(N+K+P) and the resource reserved/selected for transmission of L_MSG after slot #(N+K) or slot #(N+K+P). And/or, for example, the TX UE may reselect the entire resource reserved/selected for transmission of L_MSG. Here, for example, P may be a resource reservation period value. For the convenience of description, the PSCCH DMRS RSRP measurement value and/or the PSSCH DMRS RSRP measurement value, related to H_MSG, on slot #N may be referred to as REF RSRP.

And/or, for example, if resources reserved/selected by the TX UE for transmission of L_MSG and resources reserved/selected by another UE for transmission of H_MSG are partially or entirely overlapped in slot #(N+K), and if the TX UE decodes/receives the H_MSG related PSCCH on slot #N, the TX UE may measure the PSCCH DMRS RSRP and/or the PSSCH DMRS RSRP related to H_MSG on slot #N. And, the TX UE may measure the PSSCH DMRS RSRP and/or the PSCCH DMRS RSRP, related to H_MSG, on slot #(N+K). For example, in this case, the TX UE may not perform transmission of L_MSG on slot #(N+K). In this case, if the average or maximum or minimum between ACT_RSRP and REF RSRP is greater than a pre-configured threshold value, the TX UE may reselect the resource reserved/selected for transmission of L_MSG on slot #(N+K) or slot #(N+K+P). And/or, for example, the TX UE may reselect the resource reserved/selected for transmission of L_MSG on slot #(N+K) or slot #(N+K+P) and the resource reserved/selected for transmission of L_MSG after slot #(N+K) or slot #(N+K+P). And/or, for example, the TX UE may reselect the entire resource reserved/selected for transmission of L_MSG. Here, for example, P may be a resource reservation period value.

According to an embodiment of the present disclosure, a resource reserved/selected by the TX UE for transmission of L_MSG and a resource reserved/selected by another UE for transmission of H_MSG are partially or entirely overlapped on slot #(N+K), and if the TX UE fails to decode the H_MSG related PSSCH scheduled by the H_MSG related PSCCH on slot #N, the UE that has transmitted the H_MSG may receive the HARQ NACK from the TX UE (via PSFCH). Otherwise, for example, a UE that has transmitted H_MSG may perform overhearing the related SL HARQ feedback information transmitted by another UE, and the UE transmitting the H_MSG may determine that the TX UE has failed to decode the H_MSG related PSSCH. Here, for example, the H_MSG-related PSSCH scheduled by the H_MSG-related PSCCH may be transmitted on slot #N or slot #(N+Z). For example, Z may be a positive integer less than K.

In the above case, if the PSSCH DMRS RSRP measurement value and/or the PSFCH RSRP measurement value, related to (decoding failed) H_MSG, transmitted by another UE is greater than a pre-configured threshold, the TX UE may reselect the resource reserved/selected for transmission of L_MSG on slot #(N+K) in which retransmission for H_MSG is performed. And/or, for example, the TX UE may reselect a resource reserved/selected for transmission of L_MSG on slot #(N+K) and a resource reserved/selected for transmission of L_MSG after slot #(N+K), in which retransmission for H_MSG is performed. And/or, for example, the TX UE may reselect the entire resource reserved/selected for transmission of L_MSG.

Otherwise, the TX UE may assume/determine that the H_MSG related (potential) retransmission resource on slot #(N+K) is not (actually) used, the TX UE may use/maintain the (same) resource reserved/selected for the transmission of L_MSG. For example, when the TX UE succeeds in decoding the H_MSG-related PSSCH, and when the UE that transmitted the H_MSG receives the HARQ ACK from the TX UE (via PSFCH), the TX UE may assume/determine that the H_MSG related (potential) retransmission resource on slot #(N+K) is not (actually) used, the TX UE may use/maintain the (same) resource reserved/selected for the transmission of L_MSG. For example, when the TX UE succeeds in decoding the H_MSG related PSSCH, and when the UE that transmitted the H_MSG determines that the TX UE succeeds in decoding the H_MSG-related PSSCH by overhearing the relevant SL HARQ feedback information transmitted by another UE, the TX UE may assume/determine that the H_MSG related (potential) retransmission resource on slot #(N+K) is not (actually) used, and the TX UE may use/maintain the (same) resource reserved/selected for the transmission of L_MSG.

Figure 13:
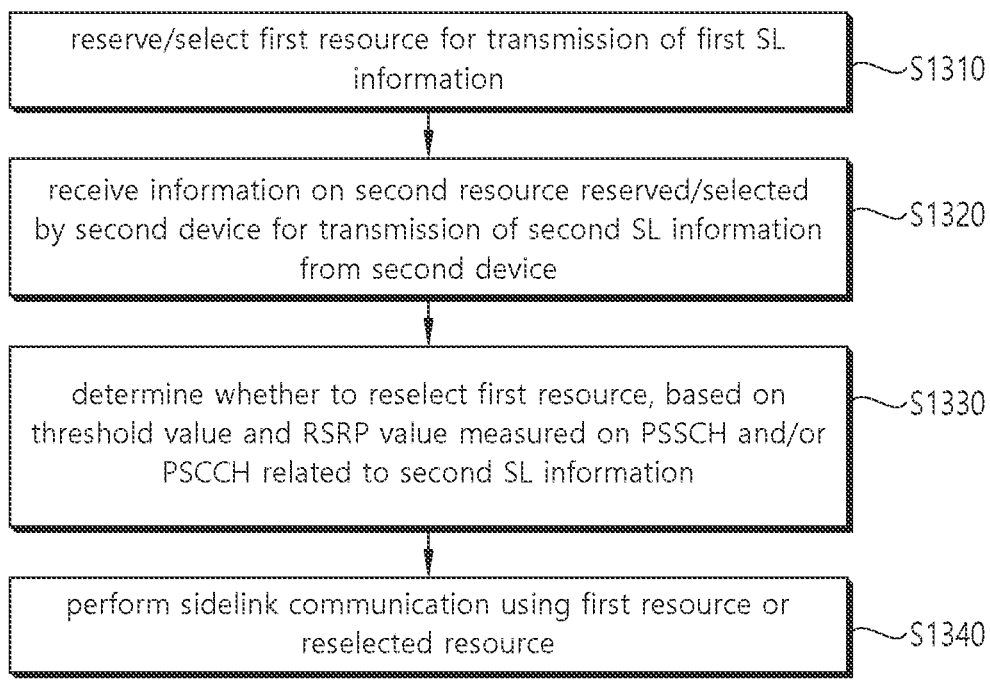
FIG. 13 illustrates a method for a first device to perform resource reselection according to an embodiment of the present disclosure.

FIG. 13 illustrates a method for a first device to perform resource reselection according to an embodiment of the present disclosure.

The embodiment of FIG. 13 could be combined with various methods and/or procedures proposed according to various embodiments of the present disclosure.

Referring to FIG. 13, in step S1310, the first device may reserve/select a first resource for transmission of first SL information. For example, the first resource may include a PSCCH resource and/or a PSSCH resource.

In step S1320, the first device may receive information on the second resource reserved/selected by the second device for transmission of the second SL information from the second device. For example, the priority of the first SL information may be lower than that of the second SL information. For example, the first resource and the second resource may be partially or entirely overlapped in the time domain and/or the frequency domain. For example, the second resource may include a PSCCH resource and/or a PSSCH resource.

In step S1330, the first device may determine whether to reselect the first resource, based on the threshold value and the RSRP value measured on PSSCH and/or PSCCH related to the second SL information. For example, according to various embodiments of the present disclosure, the first device may determine whether to reselect the first resource.

In step S1340, the first device may perform sidelink communication using the first resource or the reselected resource.

Figure 14:
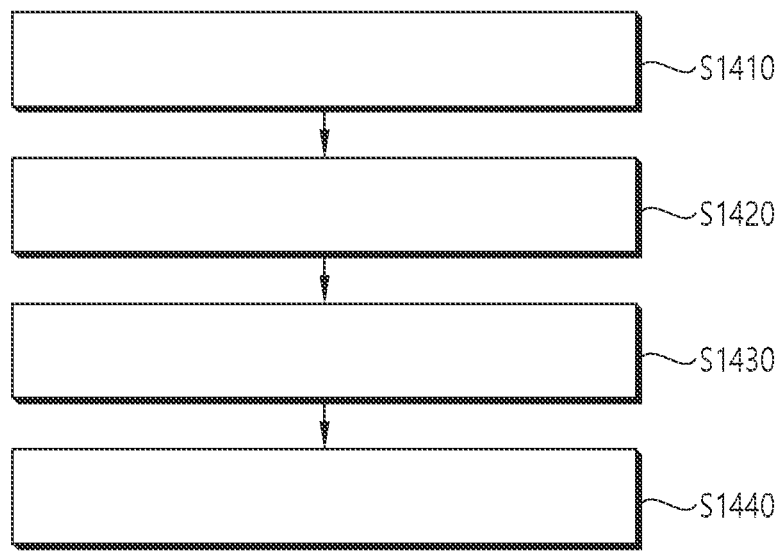
FIG. 14 is a flowchart illustrating an operation of a first device according to an embodiment of the present disclosure.

FIG. 14 is a flowchart illustrating an operation of a first device according to an embodiment of the present disclosure.

The operations disclosed in the flowchart of FIG. 14 may be performed in combination with various embodiments of the present disclosure. In one example, the operations disclosed in the flowchart of FIG. 14 may be performed based on at least one of the devices illustrated in FIGS. 16 to 21. In one example, the first device of FIG. 14 may correspond to the first wireless device 100 of FIG. 17 to be described later. In another example, the first device of FIG. 14 may correspond to the second wireless device 200 of FIG. 17 to be described later.

In step S1410, the first device according to an embodiment may determine a first resource for first sidelink transmission.

In step S1420, the first device according to an embodiment may receive, from the second device or the third device, to an Nth slot, Sidelink Control Information (SCI) including information related to a second resource for second sidelink transmission.

In step S1430, the first device according to an embodiment may determine, based on a demodulation reference signal (DMRS) Reference Signal Received Power (RSRP) measurement value of the first Physical Sidelink Control Channel (PSCCH) related to the SCI and a DMRS RSRP threshold value, whether to reselect the first resource overlapping with the second resource on an (N+K)th slot spaced from the Nth slot by K slot length.

In step S1440, the first device according to an embodiment may transmit, to the second device, a second PSCCH related to the first sidelink transmission or a Physical Sidelink Shared Channel (PSSCH) related to the second PSCCH, based on the determination on whether to reselect.

In an embodiment, at least one resource for the first sidelink transmission, including the first resource, may be determined based on P slot length, which is a resource reservation period related to the first sidelink transmission. The N, the K, and the P may be positive integers.

In an embodiment, a first priority value of the first sidelink transmission may be lower than a second priority value of the second sidelink transmission.

In an embodiment, a third resource on an (N+K+P)th slot, included in the at least one resource, may be excluded from reselection candidates.

In an embodiment, transmission of the transport block related to the second sidelink transmission may be completed before reaching an (N+P)th slot spaced from the Nth slot by the P slot length.

In an embodiment, reselection of the at least one resource by the SCI may be completed before reaching an (N+P)th slot spaced from the Nth slot by the P slot length.

In an embodiment, the step of determining whether to reselect the first resource may comprise determining to reselect the first resource, based on that the DMRS RSRP measurement value of the first PSCCH is greater than the pre-configured DMRS RSRP threshold.

In an embodiment, the step of transmitting the second PSCCH or the PSSCH to the second device may comprise transmitting the second PSCCH or the PSSCH to the second device, based on a third resource determined by reselecting the first resource.

In an embodiment, the step of determining whether to reselect the first resource may comprise determining not to reselect the first resource, based on that the DMRS RSRP measurement value of the first PSCCH is equal to or less than the pre-configured DMRS RSRP threshold.

In an embodiment, the step of transmitting the second PSCCH or the PSSCH to the second device may comprise transmitting the second PSCCH or the PSSCH to the second device based on the first resource.

In an embodiment, the pre-configured DMRS RSRP threshold may be based on at least one of a resource pool, a service type, a service priority, a cast type, a destination ID, a source ID, a Hybrid Automatic Repeat Request (HARQ) feedback type, a congestion level, a mode type, or a numerology In an embodiment, the K slot length may be less than the P slot length.

In an embodiment, provided is a first device configured to perform sidelink (SL) communication with a second device. The first device comprises, at least one memory storing instructions; at least one transceiver; and at least one processor connected to the at least one memory and the at least one transceiver, wherein the at least one processor executes the instructions to: determine a first resource for first sidelink transmission, control the at least one transceiver to receive, from the second device or a third device, on an Nth slot, SCI including information related to a second resource for second sidelink transmission, determine, on the basis of a demodulation reference signal (DMRS) Reference Signal Received Power (RSRP) threshold value and a DMRS RSRP measurement value of a first physical Sidelink Control Channel (PSCCH) related to the SCI, whether to reselect the first resource overlapping with the second resource on an (N+K)th slot spaced from the Nth slot by K slot length; and control the at least one transceiver to transmit, to the second device, a second PSCCH related to the first sidelink transmission or a PSSCH related to the second PSCCH, on the basis of the determination on whether to reselect, wherein at least one resource for the first sidelink transmission, including the first resource, is determined based on P slot length, which is a resource reservation period related to the first sidelink transmission, and wherein the N, the K, and the P are positive integers.

In an embodiment, provided is an apparatus (or a chip (set)) configured to control a first user equipment (UE) performing sidelink (SL) communication with a second UE. The apparatus comprises, at least one processor; and at least one memory connected to the at least one processor and storing instructions, wherein the at least one processor executes the instructions to: determine a first resource for first sidelink transmission, receive, from the second UE or a third UE, on an Nth slot, SCI including information related to a second resource for second sidelink transmission, determine, on the basis of a demodulation reference signal (DMRS) Reference Signal Received Power (RSRP) threshold value and a DMRS RSRP measurement value of a first physical Sidelink Control Channel (PSCCH) related to the SCI, whether to reselect the first resource overlapping with the second resource on an (N+K)th slot spaced from the Nth slot by K slot length; and transmit, to the second UE, a second PSCCH related to the first sidelink transmission or a PSSCH related to the second PSCCH, on the basis of the determination on whether to reselect, wherein at least one resource for the first sidelink transmission, including the first resource, is determined based on P slot length, which is a resource reservation period related to the first sidelink transmission, and wherein the N, the K, and the P are positive integers.

In one example, the first UE of the embodiment may refer to the first device described throughout the present disclosure. In one example, the at least one processor, the at least one memory and the like—in the device for controlling the first UE—may be implemented as separate sub-chips, respectively, alternatively, at least two or more components may be implemented through one sub-chip.

In an embodiment, provided is a non-transitory computer-readable storage medium storing instructions (or commands). The non-transitory computer-readable storage medium, when the instructions are executed, causes a first device to: determine a first resource for first sidelink transmission, receive, from the second UE or a third UE, on an Nth slot, SCI including information related to a second resource for second sidelink transmission, determine, on the basis of a DMRS RSRP threshold value and a DMRS RSRP measurement value of a first PSCCH related to the SCI, whether to reselect the first resource overlapping with the second resource on an (N+K)th slot spaced from the Nth slot by K slot length; and transmit, to the second UE, a second PSCCH related to the first sidelink transmission or a PSSCH related to the second PSCCH, on the basis of the determination on whether to reselect, wherein at least one resource for the first sidelink transmission, including the first resource, is determined based on P slot length, which is a resource reservation period related to the first sidelink transmission, and wherein the N, the K, and the P are positive integers.

Figure 15:
FIG. 15 is a flowchart illustrating an operation of a second device according to an embodiment of the present disclosure.

FIG. 15 is a flowchart illustrating an operation of a second device according to an embodiment of the present disclosure.

The operations disclosed in the flowchart of FIG. 15 may be performed in combination with various embodiments of the present disclosure. In one example, the operations disclosed in the flowchart of FIG. 15 may be performed based on at least one of the devices illustrated in FIGS. 16 to 21. In one example, the second device of FIG. 15 may correspond to the second wireless device 200 of FIG. 17 to be described later. In another example, the second device of FIG. 15 may correspond to the first wireless device 100 of FIG. 17 to be described later.

In step S1510, the second device according to an embodiment may receive, from the first device, on the basis of a second resource determined by reselecting a first resource for a first sidelink transmission by the first device, a first PSCCH associated with the first sidelink transmission or a first PSSCH associated with the first PSCCH.

In an embodiment, SCI including information related to a third resource for second sidelink transmission may be received by the first device from the second device or a third device, on an Nth slot.

In an embodiment, on the basis of a DMRS RSRP threshold value and a DMRS RSRP measurement value of a second PSCCH related to the SCI, it may be determined, by the first device, to reselect the first resource overlapping with the third resource on an (N+K)th slot spaced from the Nth slot by K slot length, In an embodiment, at least one resource for the first sidelink transmission, including the first resource, may be determined based on P slot length, which is a resource reservation period related to the first sidelink transmission. Here, the N, the K, and the P may be positive integers.

In an embodiment, a first priority value of the first sidelink transmission may be lower than a second priority value of the second sidelink transmission.

In an embodiment, a third resource on an (N+K+P)th slot, included in the at least one resource, may be excluded from reselection candidates.

In an embodiment, transmission of a transport block related to the second sidelink transmission may be completed before reaching an (N+P)th slot spaced from the Nth slot by the P slot length.

In an embodiment, reselection of the at least one resource by the SCI may be completed before reaching an (N+P)th slot spaced from the Nth slot by the P slot length.

In an embodiment, the step of determining whether to reselect the first resource may comprise determining to reselect the first resource, based on that the DMRS RSRP measurement value of the first PSCCH is greater than the pre-configured DMRS RSRP threshold.

In an embodiment, the step of transmitting the second PSCCH or the PSSCH to the second device may comprise transmitting the second PSCCH or the PSSCH to the second device, based on a third resource determined by reselecting the first resource.

In an embodiment, the step of determining whether to reselect the first resource may comprise determining not to reselect the first resource, based on that the DMRS RSRP measurement value of the first PSCCH is equal to or less than the pre-configured DMRS RSRP threshold.

In an embodiment, the step of transmitting the second PSCCH or the PSSCH to the second device may comprise transmitting the second PSCCH or the PSSCH to the second device based on the first resource.

In an embodiment, the pre-configured DMRS RSRP threshold may be based on at least one of a resource pool, a service type, a service priority, a cast type, a destination ID, a source ID, a Hybrid Automatic Repeat Request (HARQ) feedback type, a congestion level, a mode type, or a numerology In an embodiment, the K slot length may be less than the P slot length.

In an embodiment, provided is a second device configured to perform sidelink (SL) communication with a first device. The first device comprises at least one memory storing instructions; at least one transceiver; and at least one processor connected to the at least one memory and the at least one transceiver, wherein the at least one processor executes the instructions to: control the at least one transceiver to receive, from the first device, on the basis of a second resource determined by reselecting a first resource for a first sidelink transmission by the first device, a first PSCCH associated with the first sidelink transmission or a first PSSCH associated with the first PSCCH, wherein SCI including information related to a third resource for second sidelink transmission is received by the first device from the second device or a third device, on an Nth slot, wherein, on the basis of a DMRS RSRP threshold value and a DMRS RSRP measurement value of a second PSCCH related to the SCI, it is determined, by the first device, to reselect the first resource overlapping with the third resource on an (N+K)th slot spaced from the Nth slot by K slot length, wherein at least one resource for the first sidelink transmission, including the first resource, is determined based on P slot length, which is a resource reservation period related to the first sidelink transmission, and wherein the N, the K, and the P are positive integers.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
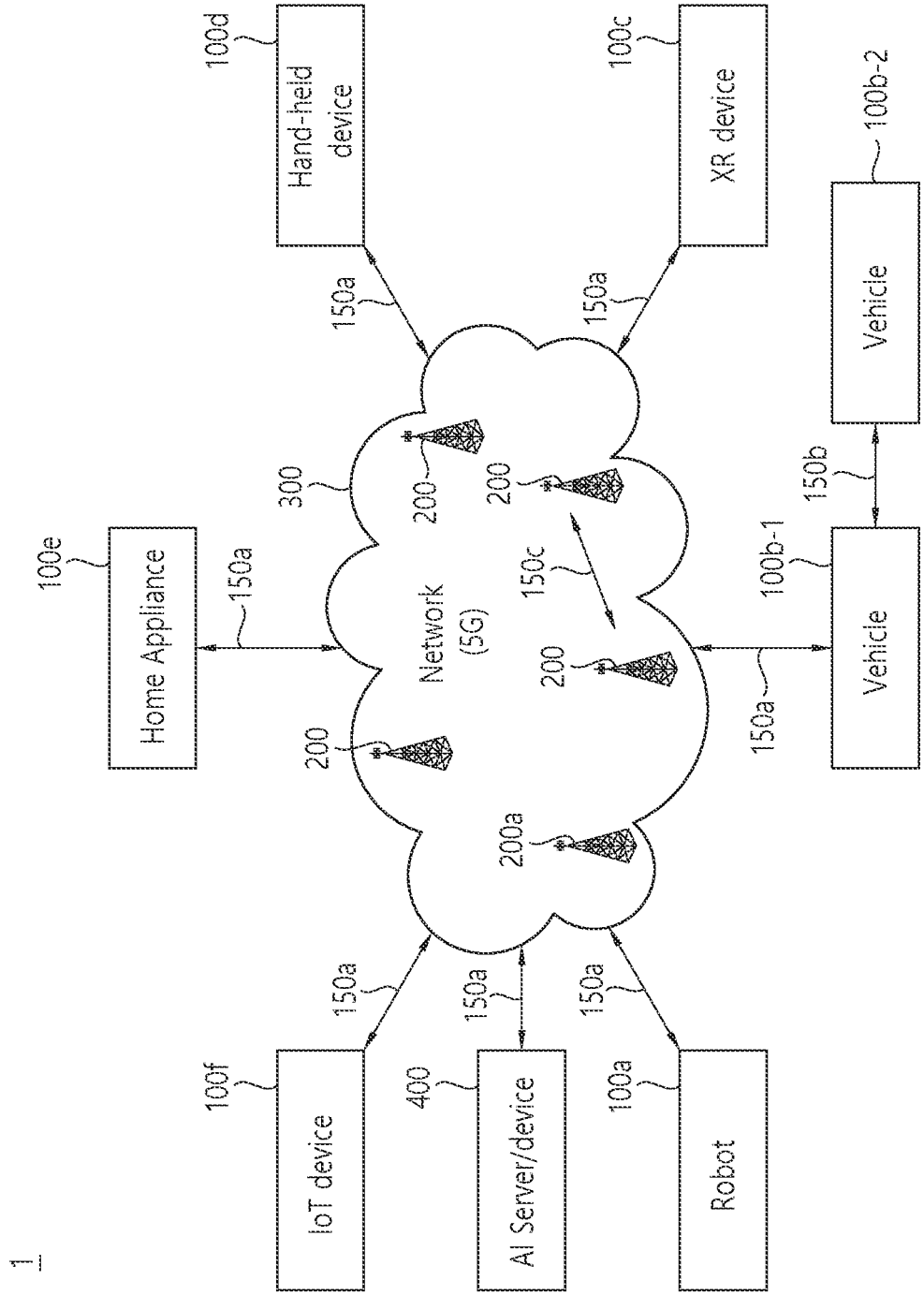
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Herein, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
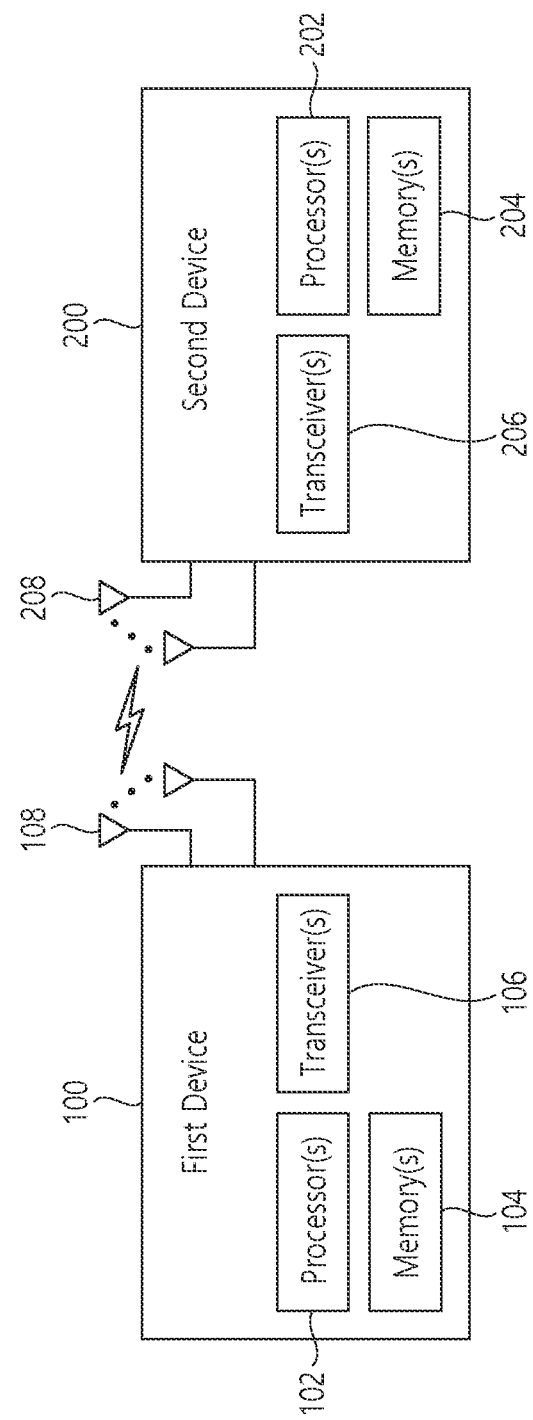
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
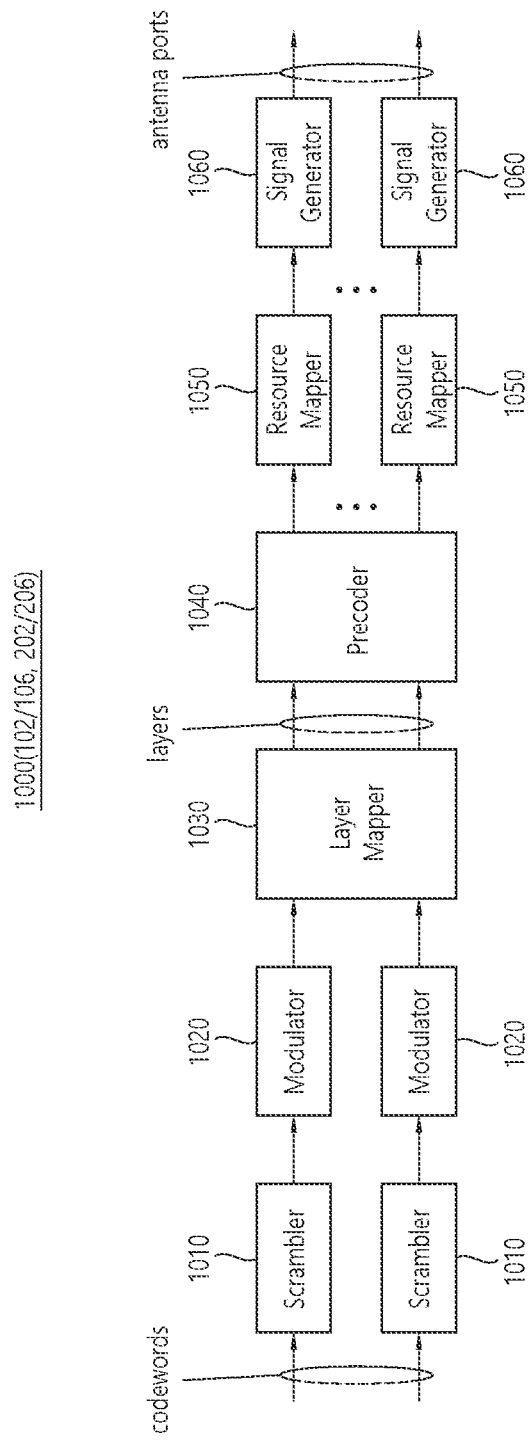
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT)

modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
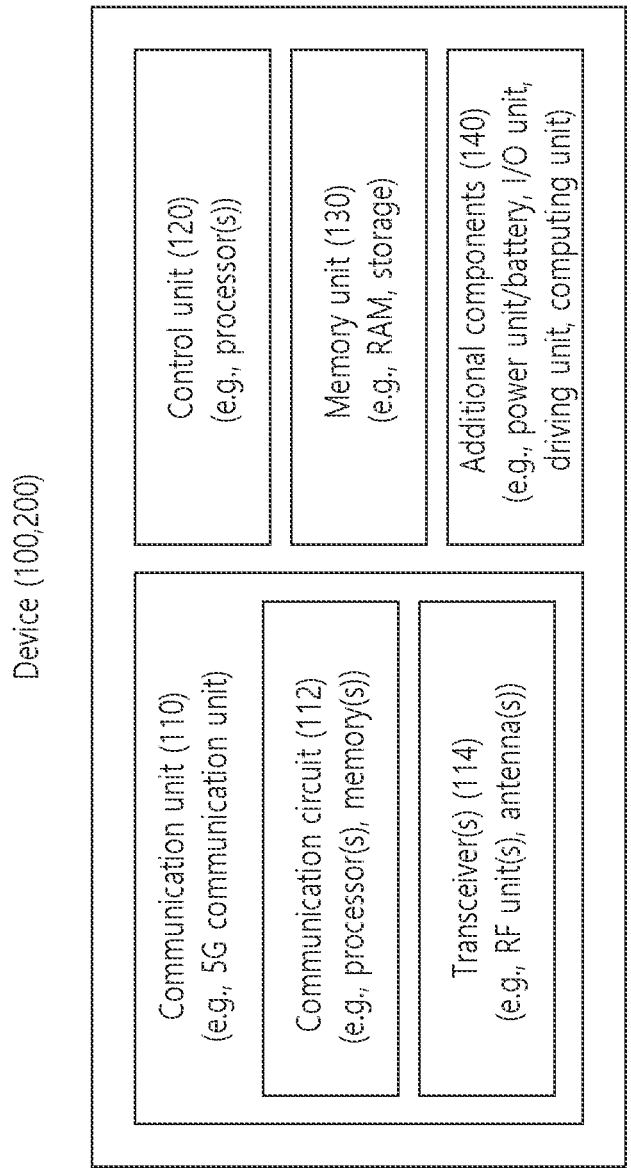
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
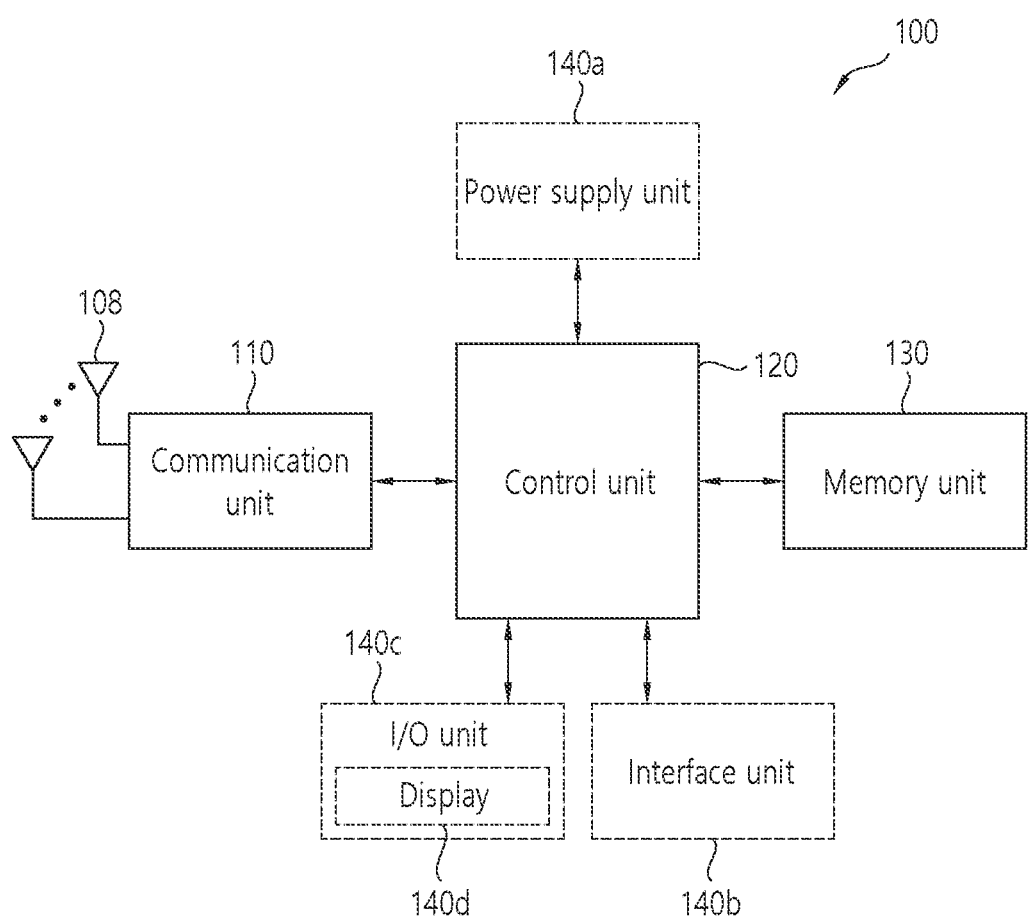
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
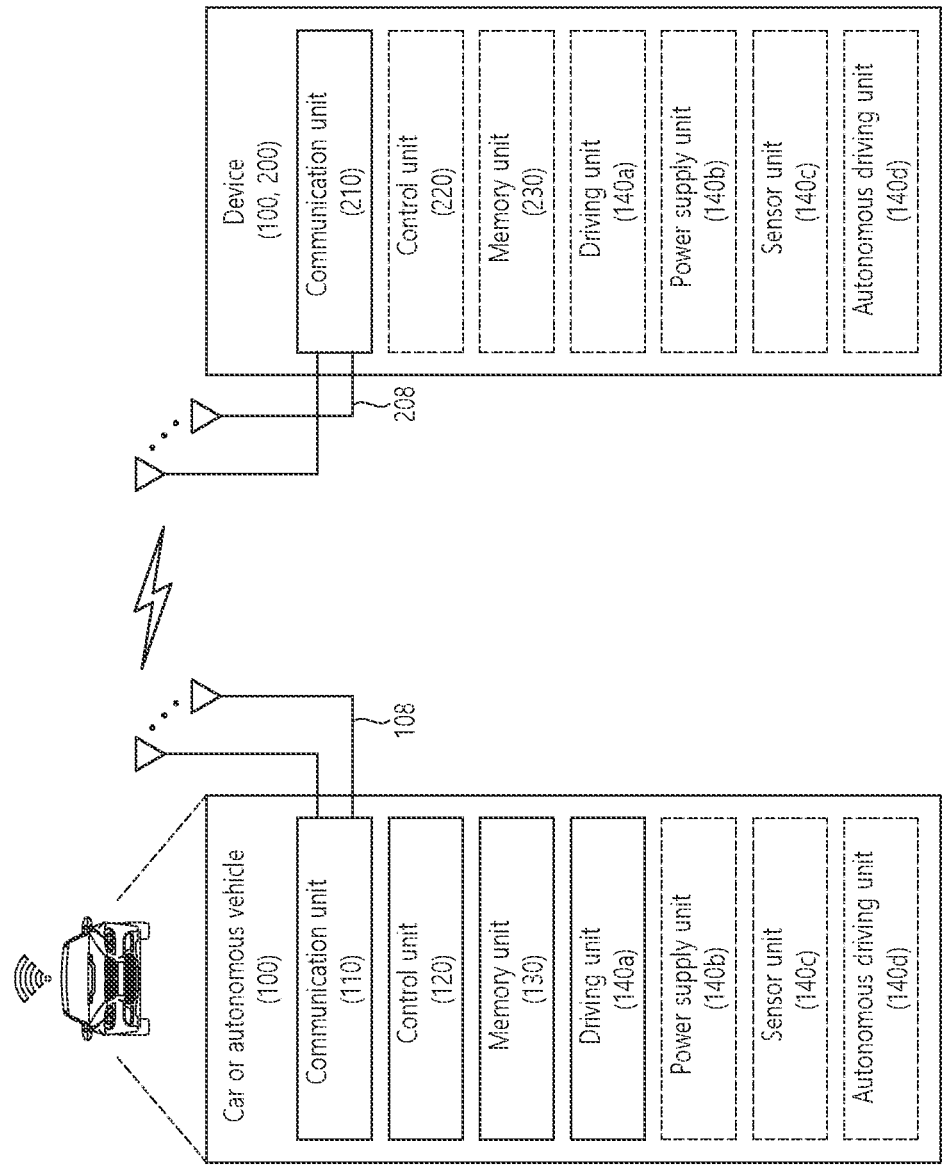
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink (SL) communication with a second device by a first device, the method comprising:
   determining a first resource for first sidelink transmission;
   receiving, from the second device or a third device, on an Nth slot, Sidelink Control Information (SCI) including information related to a second resource for second sidelink transmission;
   determining, based on a demodulation reference signal (DMRS) Reference Signal Received Power (RSRP) threshold value and a DMRS RSRP measurement value of a first Physical Sidelink Control Channel (PSCCH) or a first Physical Sidelink Shared Channel (PSSCH) related to the SCI, whether to reselect the first resource overlapping with the second resource on an (N+K)th slot spaced from the Nth slot by K slot length; and
   transmitting, to the second device, a second PSCCH related to the first sidelink transmission or a second PSSCH related to the second PSCCH, based on the basis of the determination on whether to reselect,
   wherein at least one resource for the first sidelink transmission, including the first resource, is determined based on P slot length, which is a resource reservation period related to the first sidelink transmission, and
   wherein the N, the K, and the P are positive integers.

2. The method of claim 1,
   wherein a first priority of the first sidelink transmission is lower than a second priority of the second sidelink transmission.

3. The method of claim 1,
   wherein a third resource on an (N+K+P)th slot, included in the at least one resource, is excluded from candidate resources subject to reselection.

4. The method of claim 1,
   wherein transmission of a transport block related to the second sidelink transmission is completed before reaching an (N+P)th slot spaced from the Nth slot by the P slot length.

5. The method of claim 1,
   wherein reselection of the at least one resource by the SCI is completed before reaching an (N+P)th slot spaced from the Nth slot by the P slot length.

6. The method of claim 1,
wherein determining whether to reselect the first resource comprises:
determining to reselect the first resource, based on that the DMRS RSRP measurement value is greater than the DMRS RSRP threshold.

7. The method of claim 6,
wherein transmitting the second PSCCH or the second PSSCH to the second device comprises:
transmitting the second PSCCH or the second PSSCH to the second device, based on a third resource determined by reselecting the first resource.

8. The method of claim 1,
wherein determining whether to reselect the first resource comprises:
determining not to reselect the first resource, based on that the DMRS RSRP measurement value is equal to or less than the DMRS RSRP threshold.

9. The method of claim 8,
wherein transmitting the second PSCCH or the second PSSCH to the second device comprises:
transmitting the second PSCCH or the second PSSCH to the second device based on the first resource.

10. The method of claim 1,
wherein the DMRS RSRP threshold is based on at least one of a resource pool, a service type, a service priority, a cast type, a destination ID, a source ID, a Hybrid Automatic Repeat Request (HARQ) feedback type, a congestion level, a mode type, or a numerology.

11. The method of claim 1,
wherein the K slot length is less than the P slot length.

12. A first device configured to perform sidelink (SL) communication with a second device, the first device comprising:
at least one memory storing instructions;
at least one transceiver; and
at least one processor connected to the at least one memory and the at least one transceiver, wherein the at least one processor executes the instructions to:
determine a first resource for first sidelink transmission,
control the at least one transceiver to receive, from the second device or a third device, on an Nth slot, SCI including information related to a second resource for second sidelink transmission,
determine, based on a demodulation reference signal (DMRS) Reference Signal Received Power (RSRP) threshold value and a DMRS RSRP measurement value of a first Physical Sidelink Control Channel (PSCCH) or a first Physical Sidelink Shared Channel (PSSCH) related to the SCI, whether to reselect the first resource overlapping with the second resource on an (N+K)th slot spaced from the Nth slot by K slot length; and
control the at least one transceiver to transmit, to the second device, a second PSCCH related to the first sidelink transmission or a second PSSCH related to the second PSCCH, based on the determination on whether to reselect,
wherein at least one resource for the first sidelink transmission, including the first resource, is determined based on P slot length, which is a resource reservation period related to the first sidelink transmission, and
wherein the N, the K, and the P are positive integers.

13. The first device of claim 12,
wherein a first priority of the first sidelink transmission is lower than a second priority of the second sidelink transmission.

14. The first device of claim 12,
wherein a third resource on an (N+K+P)th slot, included in the at least one resource, is excluded from candidate resources subject to reselection.

15. The first device of claim 12,
wherein transmission of a transport block related to the second sidelink transmission is completed before reaching an (N+P)th slot spaced from the Nth slot by the P slot length.

16. The first device of claim 12,
wherein reselection of the at least one resource by the SCI is completed before reaching an (N+P)th slot spaced from the Nth slot by the P slot length.

17. The first device of claim 12,
wherein determining whether to reselect the first resource comprises:
determining to reselect the first resource, based on that the DMRS RSRP measurement value is greater than the DMRS RSRP threshold.

18. The first device of claim 17,
wherein transmitting the second PSCCH or the second PSSCH to the second device comprises:
transmitting the second PSCCH or the second PSSCH to the second device, based on a third resource determined by reselecting the first resource.

19. The first device of claim 12,
wherein determining whether to reselect the first resource comprises:
determining not to reselect the first resource, based on that the DMRS RSRP measurement value is equal to or less than the DMRS RSRP threshold.

20. An apparatus configured to control a first user equipment (UE) performing sidelink (SL) communication with a second UE, the apparatus comprising:
at least one processor; and
at least one memory connected to the at least one processor and storing instructions, wherein the at least one processor executes the instructions to:
determine a first resource for first sidelink transmission,
receive, from the second UE or a third UE, on an Nth slot, SCI including information related to a second resource for second sidelink transmission,
determine, based on a demodulation reference signal (DMRS) Reference Signal Received Power (RSRP) threshold value and a DMRS RSRP measurement value of a first Physical Sidelink Control Channel (PSCCH) or a first Physical Sidelink Shared Channel (PSSCH) related to the SCI, whether to reselect the first resource overlapping with the second resource on an (N+K)th slot spaced from the Nth slot by K slot length; and
transmit, to the second UE, a second PSCCH related to the first sidelink transmission or a second PSSCH related to the second PSCCH, based on the determination on whether to reselect,
wherein at least one resource for the first sidelink transmission, including the first resource, is determined based on P slot length, which is a resource reservation period related to the first sidelink transmission, and
wherein the N, the K, and the P are positive integers.

* * * * *